United States Patent [19]

Okahashi

[11] Patent Number: 5,799,108
[45] Date of Patent: Aug. 25, 1998

[54] IMAGE DECORATIVE PROCESSING APPARATUS

[75] Inventor: Toshihiro Okahashi, Kashihara, Japan

[73] Assignee: Sharp Kabushiki Kaisha, Osaka, Japan

[21] Appl. No.: 545,061

[22] Filed: Oct. 19, 1995

[30] Foreign Application Priority Data

Oct. 20, 1994 [JP] Japan .................. 6-254985

[51] Int. Cl.$^6$ .................................. G06F 15/72
[52] U.S. Cl. .................. 382/205; 382/102; 358/448
[58] Field of Search .................. 358/448, 451, 358/456, 464; 382/103, 156, 260, 209, 256, 258, 205, 266

[56] References Cited

U.S. PATENT DOCUMENTS

| | | | |
|---|---|---|---|
| 4,186,393 | 1/1980 | Leventer | 340/729 |
| 4,648,119 | 3/1987 | Wingfield et al. | 382/205 |
| 4,680,720 | 7/1987 | Yoshii et al. | 364/521 |
| 4,729,038 | 3/1988 | Miura et al. | 358/300 |
| 5,204,752 | 4/1993 | Yamakawa | 358/296 |
| 5,237,626 | 8/1993 | Forslund et al. | 382/256 |
| 5,250,934 | 10/1993 | Denber et al | 382/258 |
| 5,384,860 | 1/1995 | Gardemal, Jr. et al. | 382/103 |

FOREIGN PATENT DOCUMENTS

| | | |
|---|---|---|
| 406084 | 1/1991 | European Pat. Off. . |
| 2588398 | 4/1987 | France . |
| 57-124969 | 8/1982 | Japan . |
| 3-42783 | 2/1991 | Japan . |
| 3-241395 | 10/1991 | Japan . |
| 4-118694 | 4/1992 | Japan . |
| 4-218879 | 8/1992 | Japan . |

*Primary Examiner*—Edward L. Coles, Sr.
*Assistant Examiner*—Stephen Brinich
*Attorney, Agent, or Firm*—David G. Conlin; William J. Daley, Jr.

[57] ABSTRACT

In an image processing apparatus, a matrix for an arbitrary pixel (to be an observed pixel) on the original image is set up so that the density of the observed pixel and that of a target pixel which is located in the direction along which shadows are formed are compared to determine a maximum value of density of the two. If the density of the observed pixel is greater than that of the target pixel or pixels, the density of the target pixel is converted into a predetermined level of density, whereas if the density of the observed pixel is less than that of the target pixel, no conversion of density is made. This procedure is repeatedly performed for the entire image information to thereby create shadows having a designated length and complete a shadowing image. Then, the shadowing image is combined with the original image, whereby a shadowed image is complete.

12 Claims, 28 Drawing Sheets

FIG.6
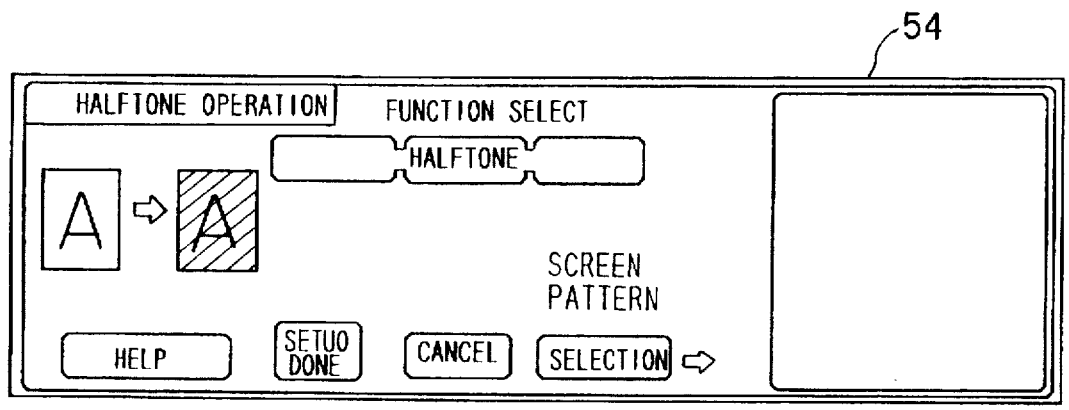
FIG.7
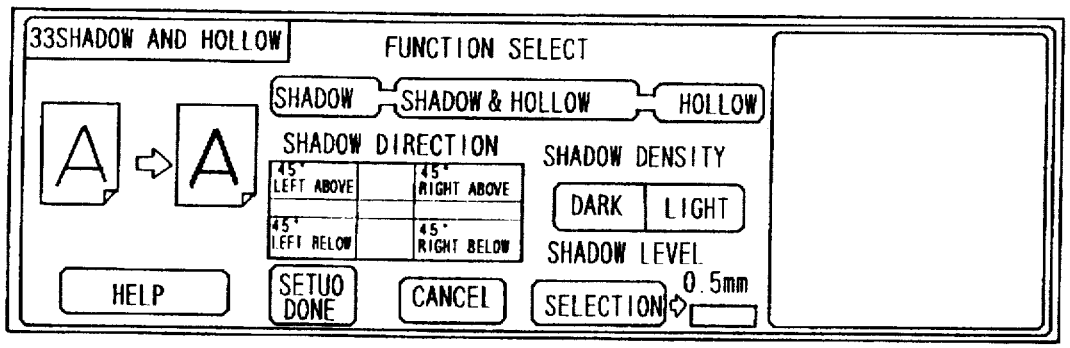
FIG.8
| A | B | C |
|---|---|---|
| D | E | F |
| G | H | I |

BLACK : LEVEL "3"
WHITE : LEVEL "0"

| | DENSITY OF PIXEL E | I | DENSITY OF PIXEL I |
|---|---|---|---|
| BLACK ↑<br>↓<br>WHITE | 3 | CONVERTED | 2 |
| | 2 | CONVERTED | 2 |
| | 1 | CONVERTED | 2 |
| | 0 | UNCONVERTED | 0 |

FIG. 15
| DENSITY OF PIXEL E | I | DENSITY OF PIXEL I |
|---|---|---|
| 3 | CONVERTED | 2 |
| 2 | UNCONVERTED | 0 |
| 1 | UNCONVERTED | 0 |
| 0 | UNCONVERTED | 0 |
FIG. 16A
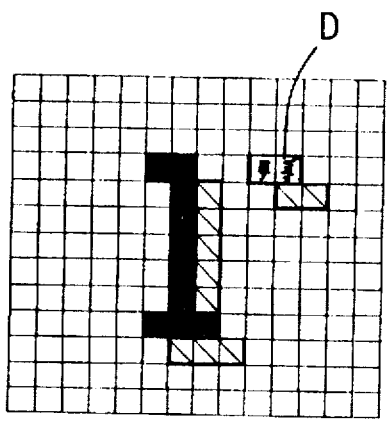
FIG. 16B
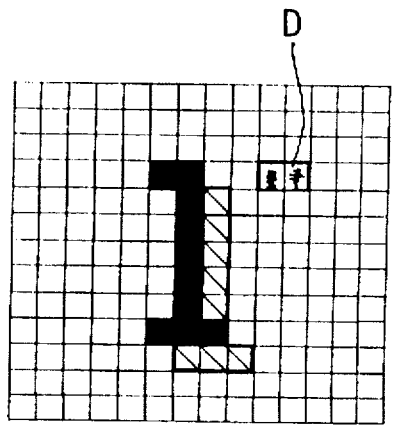

FIG. 18A    FIG. 18B
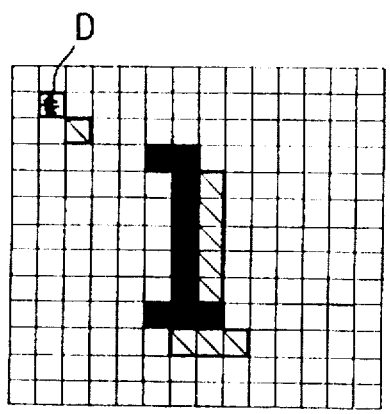 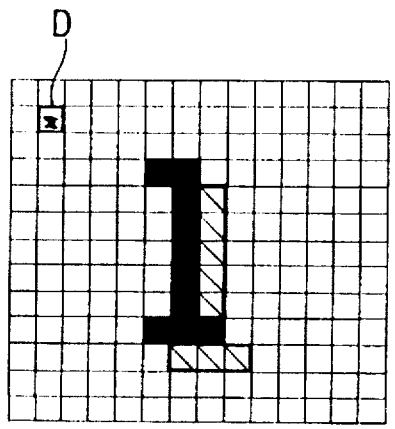
FIG. 19
| A.0 | B.0 | C.0 |
|-----|-----|-----|
| D.0 | E.0 | F.0 |
| G.0 | H.0 | I.0 |
FIG. 20
| DENSITY OF PIXEL E | SHADOW DENSITY LEVEL "2" | SHADOW DENSITY LEVEL "1" |
|---|---|---|
| 3 | 2 | 1 |
| 2 | 1 | 1 |
| 1 | 0 | 0 |
| 0 | 0 | 0 |
BLACK ↑↓ WHITE FIG.21A
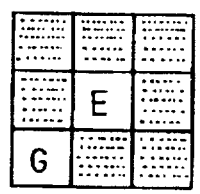
FIG.21B
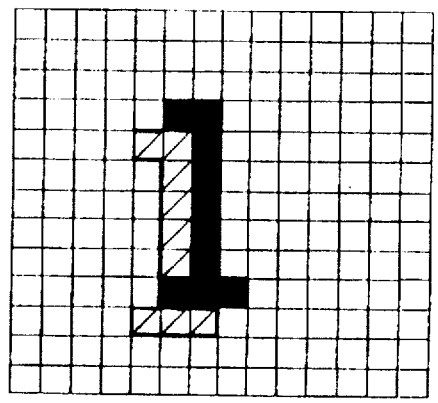
FIG.22
| | MAXIMUM VALUE | CONVERTED VALUE |
|---|---|---|
| BLACK ↑ | 3 | 2 |
| | 2 | 0 |
| ↓ WHITE | 1 | 0 |
| | 0 | 0 |

FIG.23
| MAXIMUM VALUE | CONVERTED VALUE |
|---|---|
| 3 | 1 |
| 2 | 0 |
| 1 | 0 |
| 0 | 0 |
BLACK ↕ WHITE
FIG.24A
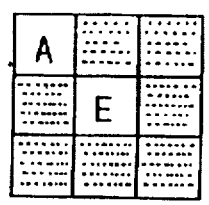
FIG.24B
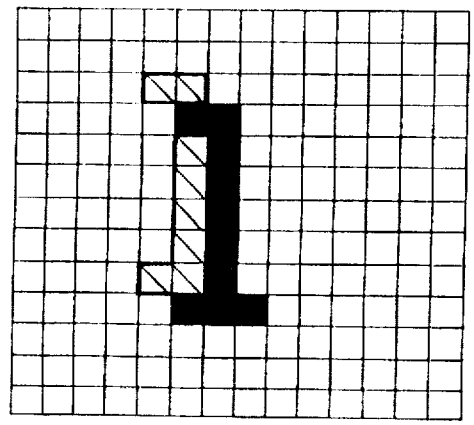

D

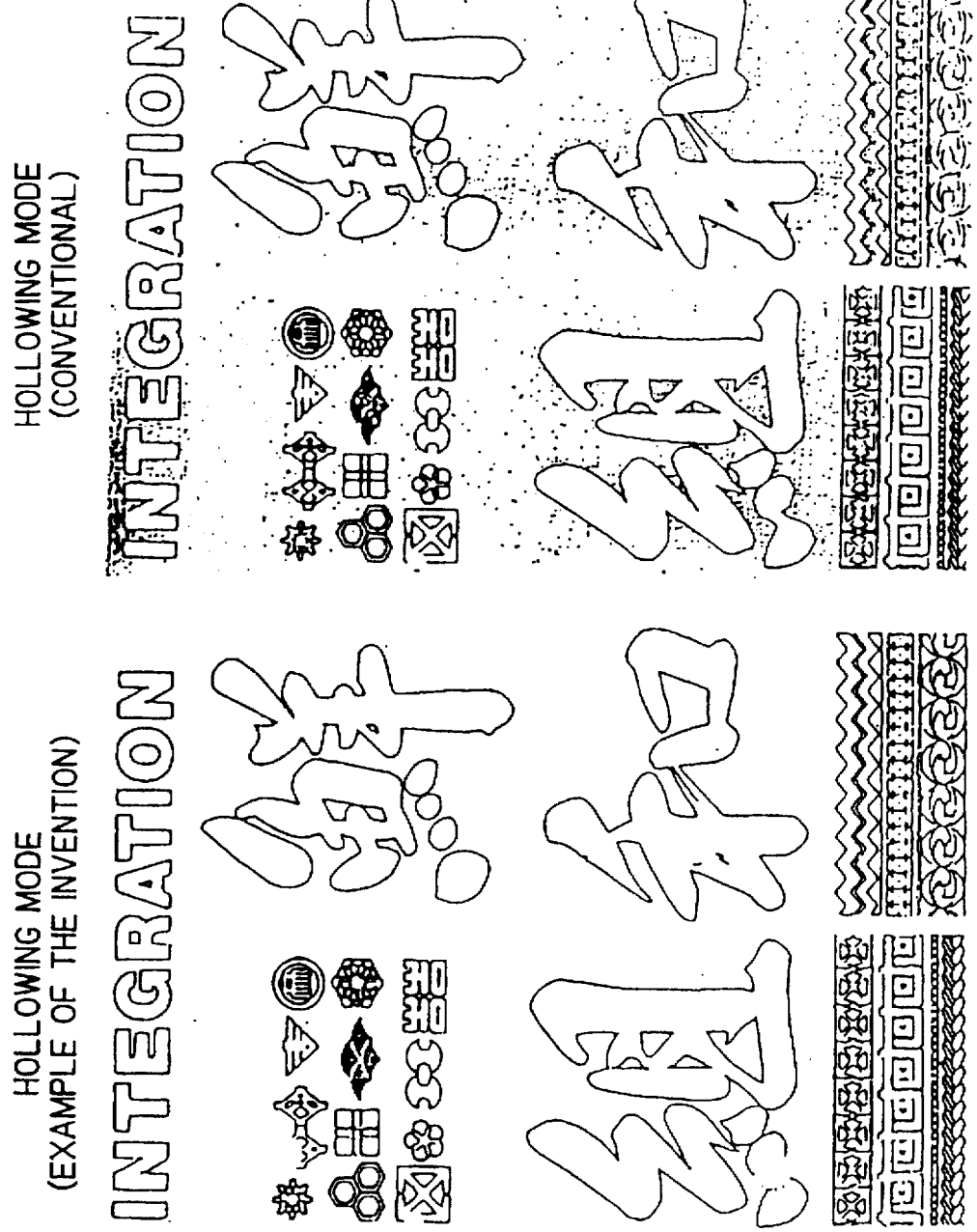

IMAGE DECORATIVE PROCESSING APPARATUS

BACKGROUND OF THE INVENTION

(1) Field of the Invention

The present invention relates to an image processing apparatus such as digital copiers, facsimiles, printers and the like, and more specifically relates to an image processing apparatus in which image information can be image-processed into desired features.

(2) Description of the Prior Art

In recent years, electrophotographic copiers have come into wide use and digital copiers have been put to practical use. With the spread of the digital copiers, various kinds of image processing techniques have been developed so that an original manuscript can be easily processed using such techniques and reproduced as an image-processed duplication. For example, Japanese Patent Application Laid-open Hei 4 No. 218,879 discloses a prior art image processing apparatus for effecting filling-in treatment, outlining treatment, shadowing treatment and the like.

In the above apparatus, input image data is transformed into binary data by way of an image input means and the thus binarized data is stored into line memories. When the outlining conversion is to be done, the data in these line memories is subjected to an N×N matrix logical operation to generate binary data representing outlines. When the shadowing conversion is to be done, the binary data in the line memories are transferred toward 45° direction, right upward to generate shadowing data. In these processing, the size of the memory region to be used are varied in accordance with the content of the image processing to be done.

In this way, the multi-valued data inputted through the image input means in the above apparatus is converted into binary data, which in turn is image processed. Accordingly, it was impossible to represent more than two tones represented by '0' and '1', only revealing inferior power of expression and poor image quality. That is, it was impossible for the above conventional configuration to meet demands of high-quality processing when high-quality image was desired to be reproduced at the time of image processing. As demand for high-quality images continues to expand, it becomes necessary to deal with multi-valued data. The multi-valued data, however, is some or several times more massive than the binary data, so that the processing time tends to become long. Accordingly, image processing having an improved processing efficiency has also been desired. The above-mentioned technique was to merely aim at improving the utility efficiency of the memories by minimizing the required number of dedicated memories when the image processing treatment was to be done. That is, no proposal was made in the disclosure to either simplify the image processing or improve the quality of images, so that the technique can not satisfy the above demands.

Examples of image processing, not mentioned in the above art, includes a halftoning process which is effected in the following manner: That is, in order to halftone an image, input image data is analyzed by one pixel to another, as shown in FIG.1, in accordance with the following rules:

(1) if all the pixels 1), 2) and 3) are white (the density is zero), no halftoning conversion is done;

(2) if the pixel 4) or 5) is white (the density is zero), no halftoning conversion is done;

(3) halftoning is effected when either of the above condition (1) or (2) is satisfied; and (4) the above procedure (1) to (3) is repeated to develop dot patterns throughout the whole input image to thereby effect halftoning.

However, if the whole image is halftoned with dots, the original image could be degraded. In order to avoid this degradation, it is necessary to check the pixel data to search contour parts in the image so as not to halftone the edge parts and therearound. This process, however, takes a long time. In consequence, this method cannot meet the requirement in view of simplifying the image processing.

SUMMARY OF THE INVENTION

In view of what has been discussed above, it is therefore an object of the present invention to provide an image processing apparatus which is improved in image-processing speed and is able to provide a good image free from degradation in image quality.

A means for solving the problems in accordance with present invention, includes: a mode-setup means for designating an image processing mode; a matrix-setup means for designating an arbitrary observed pixel and setting up a matrix of pixels containing the observed pixel at a center thereof and candidate pixels for target pixels around the observed pixel; a determining means for determining target pixel or pixels to be compared to an observed pixel, in accordance with an image processing mode designated; a comparing means for comparing the density between the observed pixel and the target pixel or pixels; a converting means for converting the density of the target pixel or pixels based on the result of the comparison; a means for repeatedly operating each means of image processing over the whole image information to generate image information; and a means for forming an image by making logical operations between the image information generated by the image processing and information on the original image, and is constructed such that the mode-setup means sets up any one of image processing modes including shadowing, hollowing and halftoning modes or a combined image processing mode of the three; and the converting means differentiating the density of an observed pixel from that of a target pixel or pixels.

When the shadowing operations is to be made, a means for arbitrary selecting a direction of shadows is provided and selection of a target pixel is made in such a manner that the target pixel to be selected from the candidate pixels around the observed pixel is located in the shadowing direction relative to the observed pixel.

When the shadowing and hollowing operation is to be made, the system includes: an expanding means for expanding peripheral pixels around an observed pixel on image information as to an original image, in a predetermined amount of pixels; a shadowing means for adding shadows extending toward a predetermined direction to the image information on the image expanded; and an image processing means for removing the image information on the original image from the image information on the shadowed image.

When the halftoning operation is to be made, the system includes: an expanding means for expanding peripheral pixels around an observed pixel on image information as to an original image, in a predetermined amount of pixels to create an expanded image; a pattern generating means for generating specific image pattern information; a removing means for removing the expanded image information from the image pattern information; and an image processing means for fitting the original image information onto the image pattern information with a portion corresponding to the expanded image information removed.

The means for solving the problems of the invention generally has a configuration described above. detailed feature of the present invention will be described as follows.

In accordance with a first aspect of the present invention, an image processing apparatus comprises: a mode-setup means for designating an image processing mode; a determining means for determining target pixel or pixels to be compared to an observed pixel, in accordance with an image processing mode designated; a comparing means for comparing the density between the observed pixel and the target pixel or pixels; and a converting means for converting the density of the target pixel or pixels based on the result of the comparison.

An image processing apparatus in accordance with a second aspect of the present invention has the above configuration and further comprises: a matrix-setup means for designating an arbitrary observed pixel and setting up a matrix of pixels containing the observed pixel at a center thereof and candidate pixels for target pixels around the observed pixel; a means for selecting a target pixel or pixels from the candidate pixels around the observed pixel, in accordance with a setup mode; a means for repeatedly operating each means of image processing over the whole image information to generate image information; and a means for forming an image by making logical operations between the image information generated by the image processing and information on the original image.

In an image processing apparatus in accordance with a third aspect of the present invention, the mode-setup means of the first configuration sets up any one of image processing modes including shadowing, hollowing and halftoning modes or a combined image processing mode of the three.

An image processing apparatus in accordance with a fourth feature of the present invention comprises: a mode-setup means for designating an image processing mode; a determining means for determining target pixel or pixels to be compared to an observed pixel, in accordance with an image processing mode designated; a comparing means for comparing the density between the observed pixel and the target pixel or pixels; and a converting means for converting the density of the target pixel or pixels based on the result of the comparison, and is constructed so that the converting means differentiates the density of an observed pixel from that of a target pixel or pixels.

An image processing apparatus in accordance with a fifth aspect of the invention has the configuration described in the third configuration above, and further comprises a means for arbitrary selecting a direction of shadows, and is characterized in that selection of a target pixel is made in such a manner that the target pixel to be selected from the candidate pixels around the observed pixel is located in the shadowing direction relative to the observed pixel.

In accordance with an image processing apparatus of a sixth aspect of the invention, the image processing apparatus has the configuration of the fifth aspect described above, and the shadowing operation includes the steps of: effecting a logical operation of comparing an observed pixel and a shadowing target pixel to take a maximum value of the density of the two, the logical operation being repeated for every observed pixel throughout the original image; converting the density of shadows to create a shadowing image data; and combining the original data with the shadowing image data to complete a shadowed image.

In accordance with an image processing apparatus of a seventh aspect of the invention, the image processing apparatus has the configuration of the sixth aspect described above, and in effecting the shadowing operation, no conversion of density of shadows is effected.

In accordance with an image processing apparatus of an eighth aspect of the invention, the image processing apparatus has the configuration of the sixth aspect described above, in effecting the shadowing operation, the density of a target pixel is set up at a lower density than that of a corresponding observed pixel when the density of shadows is converted.

In accordance with a ninth aspect of the present invention, an image processing apparatus as described in the third aspect, further has a system for the shadowing and hollowing mode which includes: an expanding means for expanding peripheral pixels around an observed pixel on image information as to an original image, in a predetermined amount of pixels; a shadowing means for adding shadows extending toward a predetermined direction to the image information on the image expanded; and an image processing means for removing the image information on the original image from the image information on the shadowed image.

In accordance with an image processing apparatus of a tenth aspect of the invention, in the image processing apparatus having the configuration of the ninth aspect described above, the shadowing and hollowing operation includes the steps of: effecting a logical operation of comparing the density of an observed pixel and all expanding target pixels around the observed pixel to take a maximum value of those pixels so as to create one-dot expanded image, the logical operation being repeated for every observed pixel along contour lines throughout the original image to form a completely expanded image; shadowing the expanded image; taking a maximum value of density of an observed pixel and a shadowing target pixel; repeatedly converting the density of shadows based on the result of the maximum taking operation between the observed pixel and the shadowing target pixel, in accordance with a designated length of shadow, until a desired, shadowed and expanded image is formed; and removing the original image from the shadowed and expanded image, to complete a shadowed and hollowed image.

In accordance with an image processing apparatus of an eleventh aspect of the invention, the image processing apparatus has the configuration of the ninth aspect described above, and in effecting the shadowing and hollowing operation, no conversion of density of shadows is effected.

In accordance with a twelfth aspect of the present invention, an image processing apparatus as described in the third aspect, further comprises a system for the halftoning mode which includes: an expanding means for expanding peripheral pixels around an observed pixel on image information as to an original image, in a predetermined amount of pixels to create an expanded image; a pattern generating means for generating specific image pattern information; a removing means for removing the expanded image information from the image pattern information; and an image processing means for fitting the original image information onto the image pattern information with a portion corresponding to the expanded image information removed.

In accordance with an image processing apparatus of a thirteenth aspect of the invention, the image processing apparatus has the configuration of the twelfth aspect described above, and the halftoning operation includes the steps of: effecting a logical operation of comparing an observed pixel and all expanding target pixels around the observed pixel to take a maximum value of density of those pixels so as to create one-dot expanded image, the logical operation being repeated for every observed pixel along clearance pixels throughout the original image to form a completely expanded image; overlapping a screen pattern on white-data areas of the expanded image to form a screen image; and removing the expanded image from the screen image and combining the original image onto the screen image to complete a halftone image.

Finally, a fourteenth aspect of the invention resides in an image processing apparatus having the configuration of the twelfth aspect described above, wherein neither determining operation of taking a maximum of density of an observed pixel and expanding target pixels nor expanding operation is effected in effecting the halftoning operation.

As described above, the image processing apparatus of the present invention, sets up a matrix for an arbitrary pixel (to be an observed pixel) on the original image so that the density of the observed pixel and that of a target pixel or pixels which are selected in association with the operating mode of image processing are compared to determine a maximum value of density of those pixels. If the density of the observed pixel is greater than that of the target pixel or pixels, the density of the target pixel or pixels is converted into a predetermined level of density, whereas if the density of the observed pixel is less than that of the target pixel or pixels, no conversion of density is made. This procedure is repeatedly performed for the entire image information to thereby create a processed image. Then the processed image is combined with the original image, whereby a desired image to be aimed in the designated mode is complete.

If an original document has noises such as smudges, dust etc., the duplication of the original is degraded in image quality since these noises are also image processed. To avoid this, the apparatus compares the density of an observed pixel with a predetermined value to thereby determine whether the pixel on question is noise or not. If the observed pixel is determined as a noise, the image processing for the pixel is prohibited to avoid unnecessary image processing, thus making it possible to improve the quality of image in the image processing.

BRIEF DESCRIPTION OF THE DRAWINGS

FIG. 6 is a view showing a display state on the panel for setting up a halftoning mode;

FIG. 7 is a view showing a display state on the panel for setting up a shadowing and hollowing mode;

FIG. 8 is a view showing a 3×3 matrix;

FIG. 15 is a table for converting density in a case where the density of a target pixel is converted;

FIG. 16A is a view showing a shadowed image in which a smudge is shadowed;

FIG. 16B is a view showing a shadowed image which is created by an image process so as not to add a shadow to a smudge;

FIG. 18A is a view showing a shadowed image in which a smudge is shadowed;

FIG. 18B is a view showing a shadowed image which is created by an image process so as not to add a shadow to a smudge;

FIG. 19 is a chart showing a matrix to be set up for isolated smudges;

FIG. 20 is a density table showing a setup example of shadowing density;

FIG. 21A is a 3×3 matrix filter for creating shadows extending 45° left below;

FIG. 21B is a shadowed image when shadows extending 45° left below are formed;

FIG. 22 is a shadow density converting table for creating dark shadows;

FIG. 23 is a shadow density converting table for creating light shadows;

FIG. 24A is a 3×3 matrix filter for creating shadows extending 45° left above;

FIG. 24B is a shadowed image when shadows extending 45° left above are formed;

FIGS. 37A, B are views showing samples created by hollowing modes in the invention and in the conventional art;

DESCRIPTION OF THE PREFERRED EMBODIMENTS

The instant invention is most clearly understood with reference to the following definition(s):

"Image decorative processing mode" shall be understood to include and mean any one of the following image processing modes shadowing mode, hollowing mode, halftoning mode, white-shadowing mode, hollow and white-shadowing mode, changing line thickness mode as well as other image processing modes known in the art such as the character-slanting mode.

Figure 1:
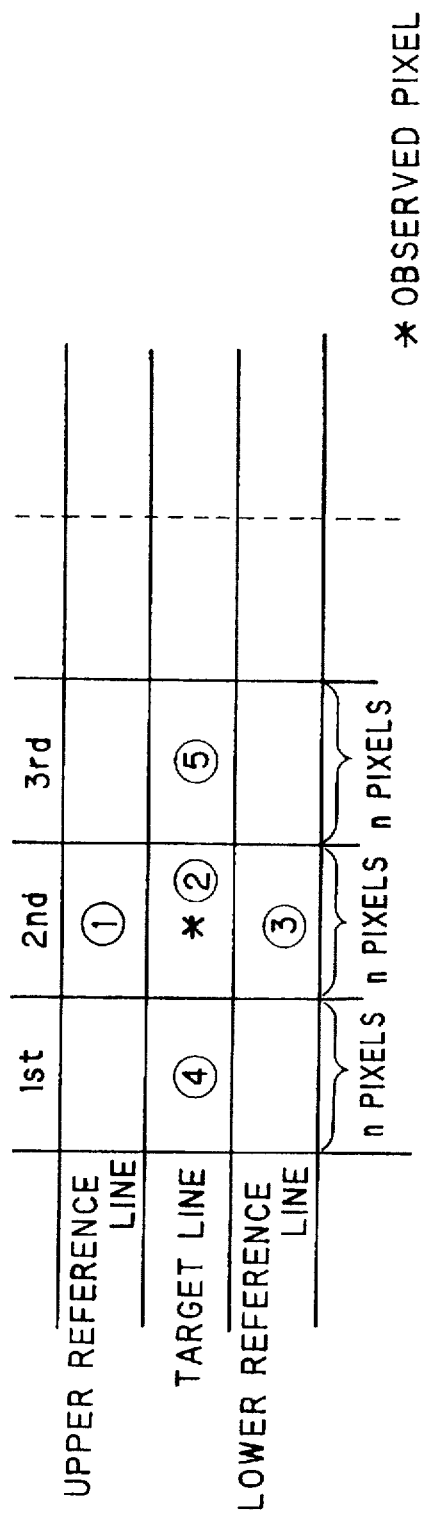
FIG. 1 is a view for illustrating a conventional halftoning process.
Figure 2:
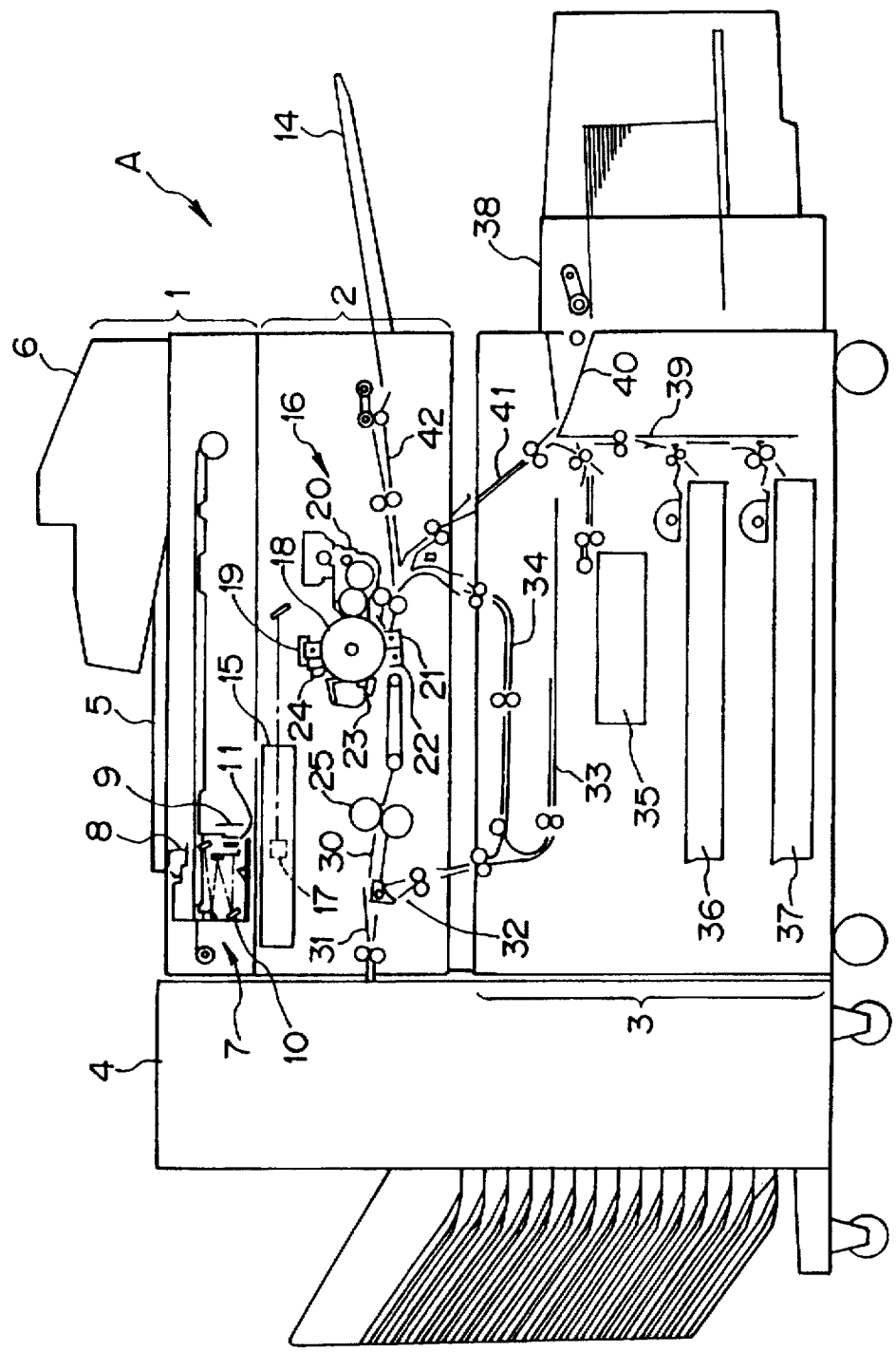
FIG. 2 is a view showing an overall configuration of a digital copier in accordance with an embodiment of the present invention.

FIG. 2 shows a facsimile built-in digital copier A having an image processing apparatus of the present invention. As shown in the figure, the digital copier A includes a scanner system 1, a laser printer system 2, a multi-sheet tray unit 3 and an automatic sorter 4.

The scanner system 1 is composed of an original table 5 made of a transparent glass, an automatic reversing document feeder (RDF) 6 and a scanner unit 7. In the RDF 6, a multiple number of original documents placed beforehand, are delivered out one by one to the scanner unit 7 in order to allow the scanner unit 7 to pick up the content of document on one side or both sides in accordance with the selection by the operator. The scanner unit 7 includes a lamp reflector assembly 8 for illuminating the document, a plurality of reflection mirrors 10 for introducing the reflected light from the document to a photoelectric transfer device (CCD) 9 and a lens 11 for focusing the reflected light from the original document on the surface of the CCD 9, forming a reflected light image.

The scanner system 1 is configurated so that when the original document placed on the original table 5 is to be scanned, the scanner unit 7 moves along the underside of the original table 5 in order to pick up the original image on the document; when the RDF 6 is used to pick up the original image on the document, the original document is moved while the scanner unit 7 is stationed at a predetermined position below the RDF 6.

Image data thus picked up from the original image by means of the scanner unit 7 is sent to an image processing system where the image data undergoes various processes. The thus processed image data is temporarily stored in a memory. Then, the image data is imparted to the laser printer system 2 in response to an output instruction, whereby the image is formed on a sheet of paper.

The laser printer system 2 includes a manually sheetfeeding tray 14, a laser-writing unit 15 and an electrophotographic processing unit 16 for creating images. The laser-writing unit 15 is composed of a semiconductor laser 17 emitting laser beams in association with the image data from the aforementioned memory, a polygonal mirror deflecting the laser beams at an equiangular rate, an f-θ lens for correcting the equiangularly deflected laser beams so that the laser spot may move linearly at a uniform speed on a photoreceptive drum 18 of the electrophotographic processing unit 16.

Arranged around the photoreceptive drum 18 in the electrophotographic processing unit 16 are a charger 19, developing unit 20, a transfer unit 21, a separator 22, a cleaning unit 23, a charge-erasing unit 24 and a fixing unit 25. A sheet conveying path 30 is disposed downstream of the fixing unit 25 or on the side to which the sheet with image formed thereon is discharged from the fixing unit 25. This sheet conveying path 30 is branched into two paths: a sheet conveying path 31 which is connected to the sorter 4 and another sheet conveying path 32 which is connected to multi-sheet tray unit 3.

The sheet conveying path 32 is further branched in the multi-sheet tray unit 3, into two sheet conveying paths, namely a sheet reversing path 33 and double-side/composition conveying path 34. The sheet reversing path 33 serves as a sheet conveying path for reversing the sheet rear-side up in the double-side copying mode in which copying is effected on both sides of the sheet. The double-side/composition conveying path 34 is used to convey the sheet from the sheet reversing path 33 to the image forming station at the photoreceptive drum 18, in the double-side copying mode. This conveying path 34 also serves to convey the sheet without reversing to the image forming station at the photoreceptive drum 18, in the one-side composition copying mode in which different original images are to be composed on one side or different color toners are used to form an image on one side.

The multi-sheet tray unit 3 has first, second and third cassettes 35, 36 and 37 and further includes a fourth cassette 38 which can be optionally added. The multi-sheet tray unit 3 has a common sheet conveying path 39, which is arranged so that sheets held in each cassette may be delivered from the top, one by one, toward the electrophotographic processing unit 16. This common sheet conveying path 39 and another sheet conveying path 40 from the fourth cassette 38, merge in a sheet conveying path 41, on the way to the electrophotographic processing unit 16. This sheet conveying path 41 is arranged so as to merge with the double-side/composition conveying path 34 and the sheet conveying path 42 from the manually sheet-feeding tray 14 and to be connected to the image forming station between the photoreceptive drum 18 and transfer unit 21 in the electrophotographic processing unit 16. That is, the meeting point of these three conveying paths is positioned near the image forming station.

In this arrangement, the laser beams in the laser writing unit 15, as modulated based on the image data loaded from the memory, are scanned onto the surface of the photoreceptive drum 18 in the electrophotographic processing unit 16 to form an electrostatic latent image on the surface. The latent image is developed with toner. The visualized toner image is electrostatically transferred onto the surface of the sheet delivered from the multi-sheet tray unit 3 and fixed thereon in the fixing unit. The sheet with the image thus formed is conveyed from the fixing unit 25 to the sorter 4 by way of the sheet conveying paths 30 and 31 or sent out to the sheet-reversing path 33 by way of the sheet conveying paths 30 and 32.

Figure 3:
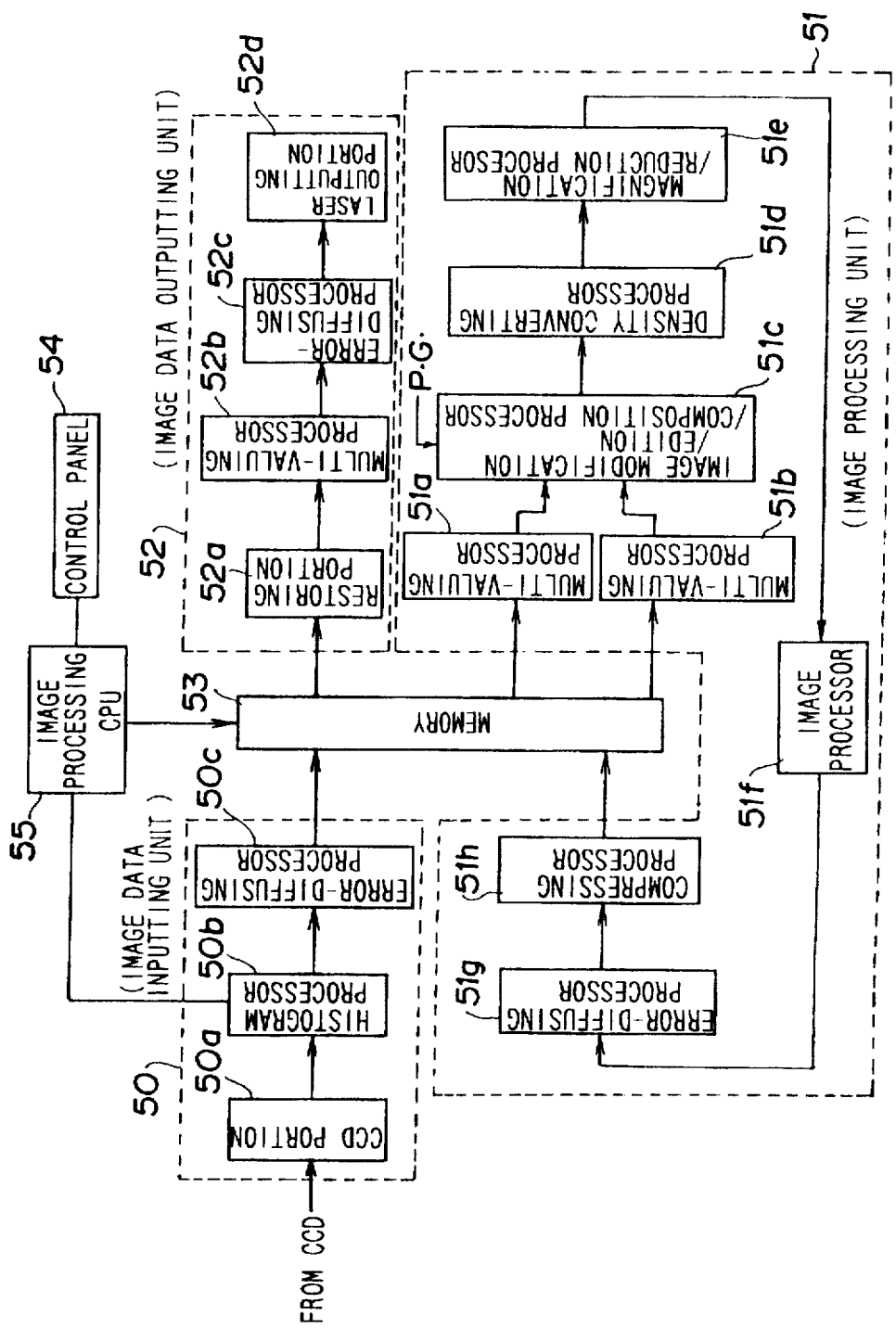
FIG. 3 is a block diagram showing configurations of an image processing system and other controlling systems in the digital copier in accordance with the embodiment of the present invention.
Figure 4:
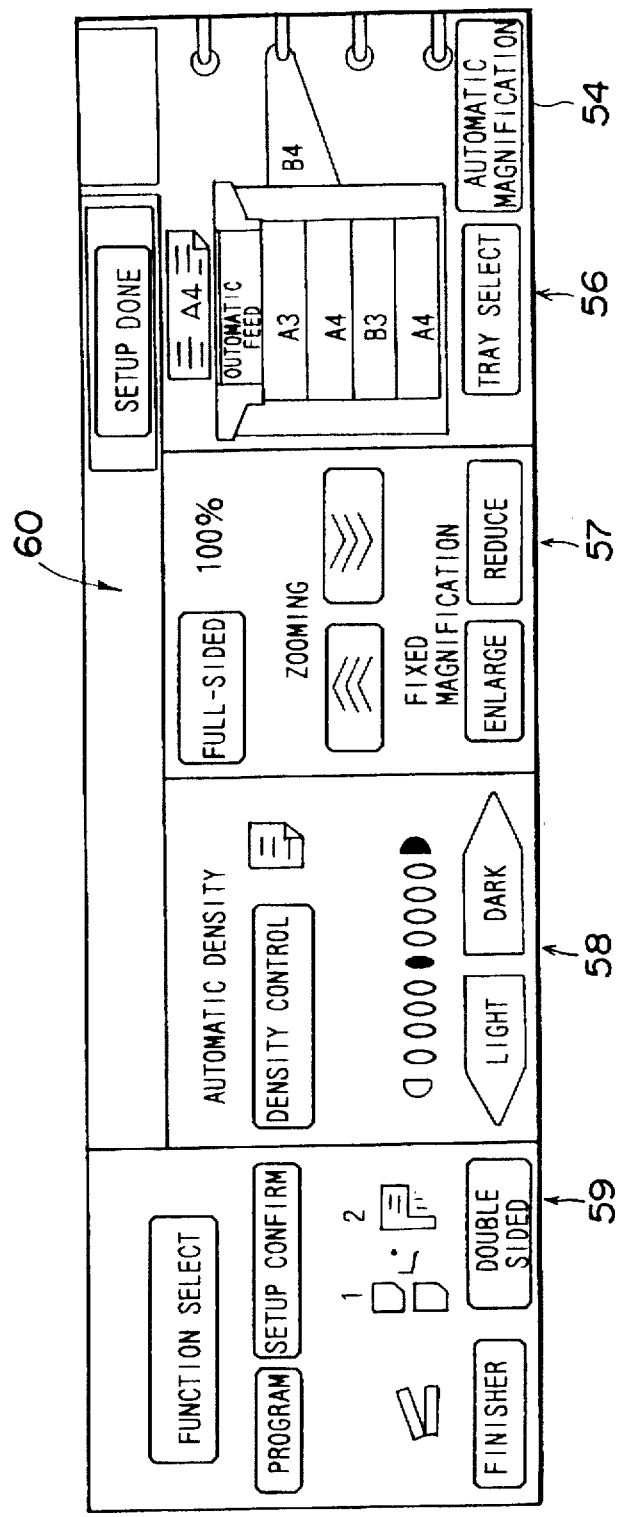
FIG. 4 is a view showing a control panel in the digital copier in accordance with the embodiment of the present invention.

Referring next to FIG. 3, configurations and functions of the image processing system and other controlling systems contained in the digital copier will be described. FIG. 3 is a block diagram showing an image processing system and other controlling systems contained in the facsimile built-in digital copier A. In the figure, a reference numeral 50 designates an image data inputting unit which is composed of a CCD portion 50a, a histogram processor 50b and an error-diffusing processor 50c. A reference numeral 51 designates an image processing unit which is composed of multi-valuing processors 51a and 51b, an image modification/edition/composition processor 51c, a density converting processor 51d, a magnification/reduction processor 51e, an image processor 51f, an error-diffusing processor 51g and a compressing processor 51h. A reference numeral 52 designates an image data outputting unit which is composed of a restoring portion 52a, multi-valuing processor 52b, an error-diffusing processor 52c and a laser outputting portion 52d. Reference numerals 53, 54 and 55 designate a memory, a control panel and an image processing CPU (central processing unit), respectively. FIG. 4 is an enlarged view of the control panel 54 having a LC touch panel controlling screen, containing a sheet-tray selecting key 56, magnification setting keys 57, copy density setting keys 58, a function selecting key 59 and a display portion 60. When the function selecting key 59 is pressed, the frame of the screen is switched over.

The image processing system contained in the digital copier A includes the image data inputting unit 50, the image processing unit 51, image data outputting unit 52, the memory 53 of RAMs (random access memories) etc., and the image processing CPU 55.

The image data inputting unit 50 includes the CCD portion 50a, the histogram processor 50b and the error-diffusing processor 50c. The image data inputting unit 50 is constructed so as to operate as follows. That is, image data, picked up from the original document by means of the CCD 9, is binarized and processed by creating a histogram based on the binary digital quantities. Then, the thus processed image data is temporarily stored in the memory 53. That is, in the CCD portion 50a, analog electric signals representing image density of the image data are A/D transformed, thereafter, the digital signal is subjected to the MTF (modulation transfer function) correction, the black and white correction or the gamma correction, whereby the output for each pixel is supplied to the histogram processor 50b as a digital signal representing 256 tones (8 bits).

In the histogram processor 50b, density information (represented by histogram data) is obtained by adding the number of pixels having the same density level by classification of 256 tones. The thus obtained histogram data is supplied, as required, to the image processing CPU 55 and sent to the error-diffusing processor 50c as pixel data. In the error-diffusing processor 50c, the digital signals each having 8 bits per pixel, outputted from the CCD portion 50a, are converted into 2 bit (quaternary) signals by the error-diffusing method as one kind of pseudo-intermediate processes or the method in which quaternarized errors are used to determine quaternarizing the neighboring pixels. Then redistributing operations are effected in order to faithfully reproduce local area densities in the original document.

The image processing unit 51 includes the multi-valuing processors 51a and 51b, the image modification/edition/composition processor 51c, the density converting processor 51d, the magnification/reduction processor 51e, the image processor 51f, the error-diffusing processor 51g and the compressing processor 51h. The image processing unit 51 outputs finalized image data which is desired by the operator, by converting the input image data in conformity with the image processing mode instructed through the control panel 54. That is, this processing unit is so constructed as to continue to process the input image data until the finally converted output image data is entirely stored in the memory 53. Here, each of the above-mentioned processors contained in the image processing unit 51 will operate as required and should not operate necessarily.

Specifically, the multi-valuing processors 51a and 51b reconvert the data quaternarized in the error-diffusing processor 50c, into 256-valued data. The image modification/edition/composition processor 51c, selectively effects a logical operation, i.e., logical OR, logical product or exclusive OR, for each pixel. This logical operation is executed for the image data stored in the memory 53 and bit data from a pattern generator (PG).

The density converting processor 51d sets up, based on a predetermined gradation converting table, an arbitrary relation of the output densities to the input densities as to the digital signals representing 256 tones of density, in accordance with an instruction through the copy density keys 58 on the control panel 54.

The magnification/reduction processor 51e effects interpolation based on the known data inputted, in conformity with a magnification designated by the magnification setting key 57 on the control panel 54, to thereby determine pixel data (density value) representing a size-varied pixel with respect to size-varied target pixels. Based on the newly determined pixel data, the image data is updated by sequentially converting the image data in the auxiliary scan direction and thereafter in the main scan direction.

In the image processor 51f, the pixel data inputted is subjected to various kinds of image processing. In addition, the image processor 51f can make a collection of information on the data sequences such as feature extraction and the like. In the error-diffusing processor 51g effects a similar process effected in the error-diffusing processor 50c of the image data inputting unit 50. The compressing processor 51h compresses the binary data based on a coding scheme called Run Length Coding. On the other hand, compressing of the image data is effected in the last processing loop when finally outputting image data is completely formed.

The image data outputting unit 52 includes the restoring portion 52a, the multi-valuing processor 52b, the error-diffusing processor 52c and the laser outputting portion 52d. The image data outputting unit 52 is configurated as follows. The unit 52 restores the compressed image data stored in the memory 53 to the original state and reconverts the restored data to the original image data having 256 tones of density. Then, the image data outputting unit 52 effects error-diffusing based on quaternary data with which it is possible to represent more gentle halftoned gradations than with binary data. The thus processed data is transferred to the laser outputting portion 52d. More specifically, in the restoring portion 52a, the image data compressed by the compressing processor 51b is restored to the original state. In the multi-valuing processor 52b, a similar process to that effected in the multi-valuing processors 51a and 51b of the image processing unit 51 is performed. In the error-diffusing processor 52c, a similar process to that effected in the error-diffusing processor 50c in the image data inputting unit 50 is performed. In the laser outputting portion 52d, the digital pixel data is converted, based on control signals from an unillustrated sequence controller, into switching signals for the semiconductor laser 17, so that the semiconductor laser 17 is turned on and off.

Accordingly, in the image processing unit 51, the pixel data which represents 256 tones for every pixel is quantized into compressed pixel data representing 4 tones for every pixel. The thus quantized image data is used to determine the output width (illuminating time) of the laser beams from the semiconductor laser 17 for each pixel (one dot). In other words, the pixel data having four tones for every pixel is brought into gradational representation by varying the output width of the laser beams from the semiconductor laser 17.

Figure 5:
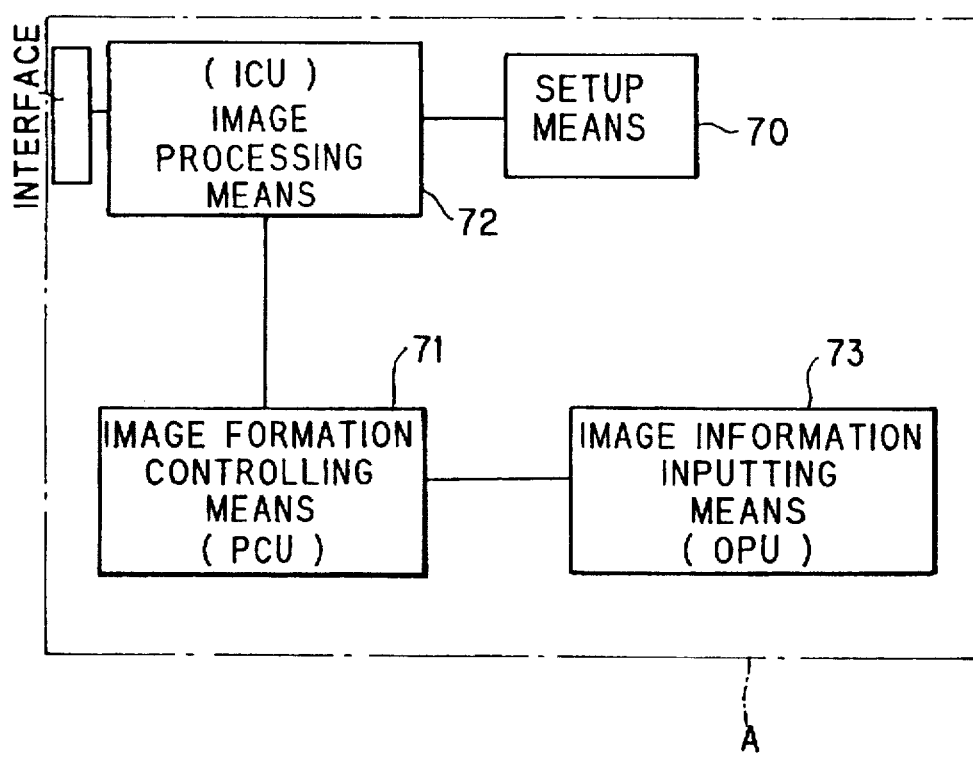
FIG. 5 is a view showing a control block diagram for processing images in the digital copier of the embodiment of the present invention.

The copier A of this embodiment has image processing functions for modification and edition of images such as shadowing, hollowing and halftoning. That is, as shown in FIG. 5, the copier A includes: a mode setup means 70 for selecting an image processing mode from shadowing, hollowing, halftoning and combinations of these; an image formation controlling means 71 for controlling image forming, based on the image information inputted; image processing means 72 for processing the image information based on an image processing mode selected; an image information inputting means 73 such as the CCD 9 for inputting image data to the image formation controlling means 71. Specifically, the mode setup means 70 includes function selecting keys and the like on the control panel 54. The image formation controlling means 71 embodied by the image processing CPU 55, the memory 53 and the like. The image processing means 72 includes the image processing unit 51, the image data inputting unit 50 and the image data outputting unit 52.

The image processing means 72 effects the following basic functions for image processing. That is, the image processing means 72 effects: a determining function in which the image data picked up by the image information inputting means 73 is converted into binary or multi-valued data and one or some target pixels to be compared to an observed pixel is determined in accordance with an image processing mode selected; a comparing function of comparing the density of target pixel or pixels to that of the observed pixel; a converting function of converting the density of the target pixel or pixels based on the result of the comparison; and a function of distinguishing whether the image data on an observed pixel is noise, based on the density information of the observed pixel and prohibiting the image processing when the data is determined as a noise. Here, the observed pixel means a pixel being observed on an original and to be image processed while the peripheral pixels indicate those enclosing the observed pixel and further the target pixels indicate those to be subjected to an image processing such as shadowing and the like.

The means 72 further has functions characteristic of each image processing mode. Specifically, the characteristic functions for the shadowing mode, includes: a function of stopping conversion of density of target pixels or prohibiting the image processing when the density of an observed pixel is equal to or less than the shadowing density or when an observed pixel has a predetermined quantized density value; a function of differentiating the density of a target pixel or pixels from that of an observed pixel when the density of the target pixel(s) is converted relative to the observed pixel, or particularly a function of reducing the density of the target pixel(s) when the shadowing image is to be discriminated from the original image; a function of varying the density of shadowing; and a function of setting up an arbitrary direction of shadowing in the image information on the target pixel(s). To deal with a case where shadowing is effected on an image rotated, the means 72 has a function of determining a shadowing direction for the image information on the rotated image. Further, in order to handle a case where the placing direction of an original document does not match that of the transfer paper, the image processing means 72 has a function of detecting the direction of the original and the direction of the transfer paper to compare the directions each other and rotating the image information if the directions differ; a function of determining, based on the rotated direction of the image, a direction of a target pixel or pixels to be shadowed with respect to an observed pixel; and a function of comparing the density of the determined target pixel(s) relative with the observed pixel and converting the density of the target pixel(s).

For the hollowing mode, the image processing means 72 effects: a function of expanding peripheral pixels of an observed pixel in a predetermined amount; and a function of removing the original image information from the expanded image information by effecting logical operations. For the shadowing and hollowing mode, the image processing means 72 effects: a function of expanding peripheral pixels around an observed pixel in a predetermined amount; a function of creating shadows in a predetermined direction on the image information after the expansion; and a function of removing the original image information from the expanded image information by effecting logical operations. If, in the shadowing and hollowing mode, the density of the target pixel(s) is to be converted relative to the observed pixel, the means 72 further has a function of differentiating the density of the target pixel(s), particularly increasing the density of the target pixels in order to enhance sharpness of the contour; and a function of stopping conversion of density of the target pixels or prohibiting the image processing when an observed pixel has a predetermined quantized density value.

For the halftoning mode, the means 72 has a function of expanding peripheral pixels around an observed pixel in a predetermined amount; a function of preparing particular image pattern information; a function of removing the image information after the expansion from the prepared image pattern information; a function of fitting the original image information onto the image pattern information with the image information of the expanded image removed, by effecting logical operations; and a function of sequentially effecting expanding operations for every pixel without effecting expansion of the image information when the density of an observed pixel is lower than a predetermined quantized value.

Now, practical procedures for effecting each of the image processing will be described. In the beginning, when the function selecting key on the control panel 54 is pressed in order to select one of the image processing modes, a setup frame for the halftoning mode is displayed as shown in FIG. 6. Further pressing of the function selecting key causes the display to present another setup frame for the shadowing and hollowing mode, as shown in FIG. 7. This setup frame displays three modes, i.e., the shadowing mode, the shadowing and hollowing mode and the hollowing mode so as to allow an user to select one mode from these.

When the user selects the shadowing mode, the user should place an original on the original table 5 or on the original feeder (RDF) 6 and press the copy start key. As the operation starts, the scanner unit 7 picks up the original image from the document placed. The image data thus picked up is stored into the memory 53 through the image data inputting unit 50, so that various processing may be made in the image processing unit 51. Initially, the image data is quantized into quaternary data in the error-diffusing processor 50c in the image data inputting unit 50. The thus quantized data is stored into the memory 53 and made to pass through the multi-valuing processor 51a without being converted into 256-valued data by the multi-valuing process. When the shadowing mode is selected, the image data is image-processed in the image modification/edition/composition processor 51c by a 3×3 matrix as shown in FIG. 8. This matrix is well-known and is the one normally used in the art. In this image processing, a code is set up to take a maximum value of density between an observed pixel E and a target pixel I. That is, the processor 51c is operated so as to compare the density between the pixels E and I. If the density of the pixel E ($D_E$) is not less than that of the pixel I ($D_I$) or $D_E \geq D_I$, $D_I$ will be replaced by $D_E$; and if the density of the pixel E ($D_E$) is less than that of the pixel I ($D_I$) or $D_E < D_I$, $D_I$ will not be modified.

Figure 9:
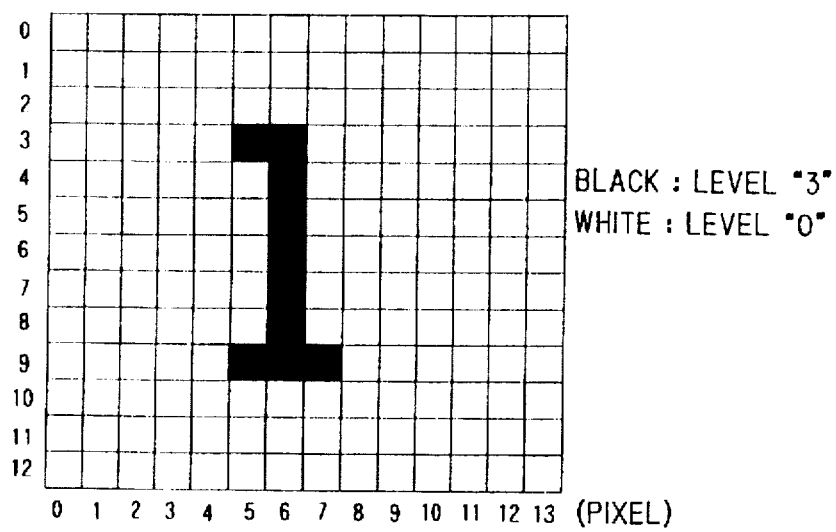
FIG. 9 is a view showing an original image.
Figure 10A:
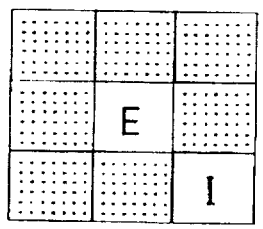
FIG. 10A is a view showing a 3×3 matrix filter.
Figure 11:
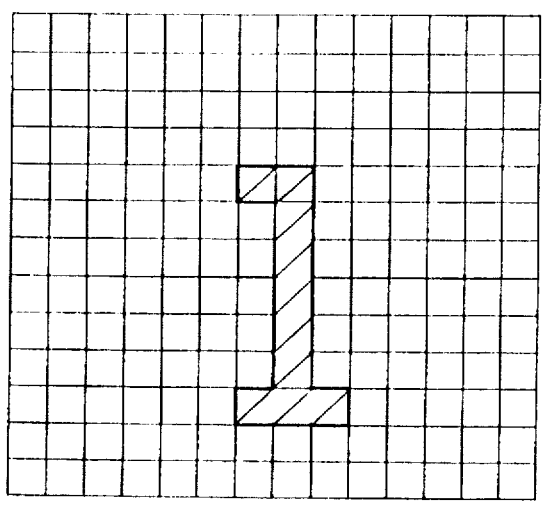
FIG. 11 is a view showing a shadowing image.
Figure 12:
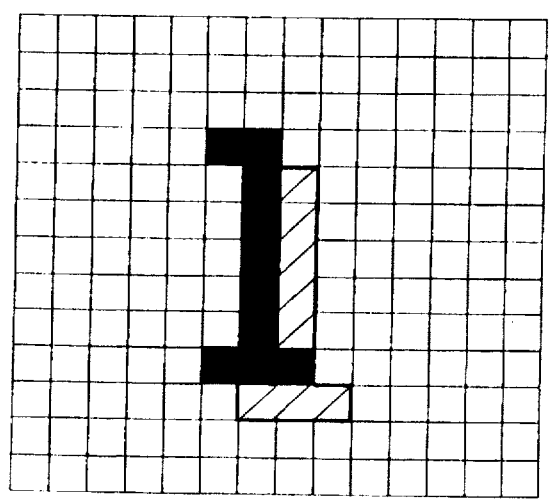
FIG. 12 is a view showing the original image with shadows.

The original-image data as shown in FIG. 9 is supplied to the 3×3 matrix filter in the order of (0,0), (1,0) ... (12,12), (13,12). A line buffer is placed before the filter. In this arrangement, the filter becomes able to start processing the data only when first three lines are inputted to the line buffer. The filter is preset so as to take a maximum value of $D_E$ and $D_I$ with the other pixels masked, as shown in FIG. 10A. The data is supplied from the top left to the bottom right. In a case shown in FIG. 10B, the observed pixel E has a density of level '3' and the shadowing target pixel I has a density of level '0' while the other pixels are being masked. Hence the maximum value thereof is determined to be '3' so that the shadowing target pixel I is outputted with a density of level '3'. As the shadowing target pixel I having a density of level '3' is outputted, the density converting processor 51d converts the density of the shadow, so that the shadowing density is converted as, to be, for example, '1'. This procedure is repeated to sweep the whole image frame, whereby a shadow image displaced by one dot toward 45° right below from the original image can be formed as shown in FIG. 11. In the final stage, the image modification/edition/composition processor 51c combines the thus formed shadow image data with the original image data stored in the memory 53, to thereby complete the shadowing process. The thus generated image data is supplied from the image data outputting unit 52 to the laser printer system 2, which in turn completes an output image having a one-dot shadow as shown in FIG. 12.

In the above shadowing operation, the length of the shadow or how many dots of shadow is to be formed, is determined by the number of repeating the image loop. For example, if the printer has a resolution of 400 dpi and shadows of 0.5 mm in length are desired, the image loop should be repeated eight times to complete the image data with the desired shadow. When shadows of 1 mm are to be formed, the image loop should be repeated sixteen times although a longer processing time is required for the increase. Here, although the foregoing description of the embodiment has been made with reference to the quaternary data, the processing can be done for binary data or data representing 256 values. In this connection, if quaternary data is applied to 256-valued data, '0','1','2' and '3' are converted into '0', '85', '170' and '255,' respectively.

Figures 13A, 13B, 13C, 14:
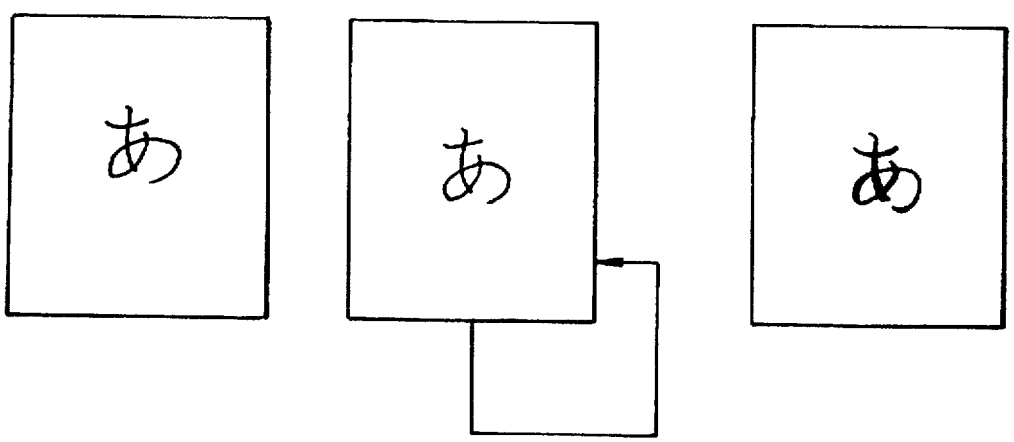
FIG. 13A is an view showing an original image data to be subjected to a shadowing operation.
FIG. 13B is a view for illustrating the procedure of forming a shadowing image for the shadowing operation.
FIG. 13C is a view showing a shadowed image formed by combining the original image with the shadowing image.
FIG. 14 is a table for converting density in a case where the density of a target pixel is not converted.

The above shadowing process can be summarized by the following algorithm:

(1) Create a shadowing image from an original image by deleting all observed pixels E having a density of level '1' in original image data (FIG. 13A).

(2) Compare the density of each observed pixel E with that of a corresponding target pixel I to determine the maximum density of the pixels.

(3) Convert the shadow density based on the maximum density.

(4) Repeat the above procedures (1) and (2) certain times in accordance with a specified length of shadow to complete the creation of a shadowing image (FIG. 13B).

(5) Synthesize the shadowing image with the original image to complete the shadowed image (FIG. 13C).

As will be described later, in order not to emphasize noises and not to degrade image elements having relatively low-density medium gradations, any pixel having a density of not greater than level '1' ($D_E \leq 1$) is assumed to be a noise and any pixel having a density of level '2' or greater ($D_E \geq 2$) will be shadowed. Specifically, when the tone or density of an observed pixel is '3' or '2', the shadowing pixel will be shaded in level '1'; when the tone of an observed pixel is '1' or '0', the destiny of the shadowing pixel will be unshaded or shaded in level '0'.

Nevertheless, when, in the above image processing, an original containing a halftone, i.e., medium gradations or colored characters other than those in black is tried to be copied while a shadowing process shown in FIG. 14 being effected, the following problems occur. That is, since the shadowing process shown in FIG. 14 creates shadows having a shadowing density of level '2'; regardless of whether an observed pixel E has a density of level '1' or '2', the density of the corresponding target pixel I will be converted into level '2'. Accordingly, the halftoned or medium-toned picture also is shadowed only to be spoiled, or the colored characters other than those in black also are shadowed so that the characters blur or become thick. To avoid this, the system is adapted to compare the density of every observed pixel E with that of a corresponding shadow-target pixel I when the shadowing pixel I would have been determined to have a density of level '2'. If the shadowing density is greater than the density of the observed pixel E, the system is adapted so as not to effect any shadowing density conversion. In this example, although the shadowing density is assumed to be level '2', the shadowing density could be varied. In this way, since observed pixels having light tones are not shadowed, neither blur nor thickness does occur in the image, or any halftone image is not spoiled either. Accordingly, it is possible to make duplications free from degradation of images.

Figures 17A, 17B:
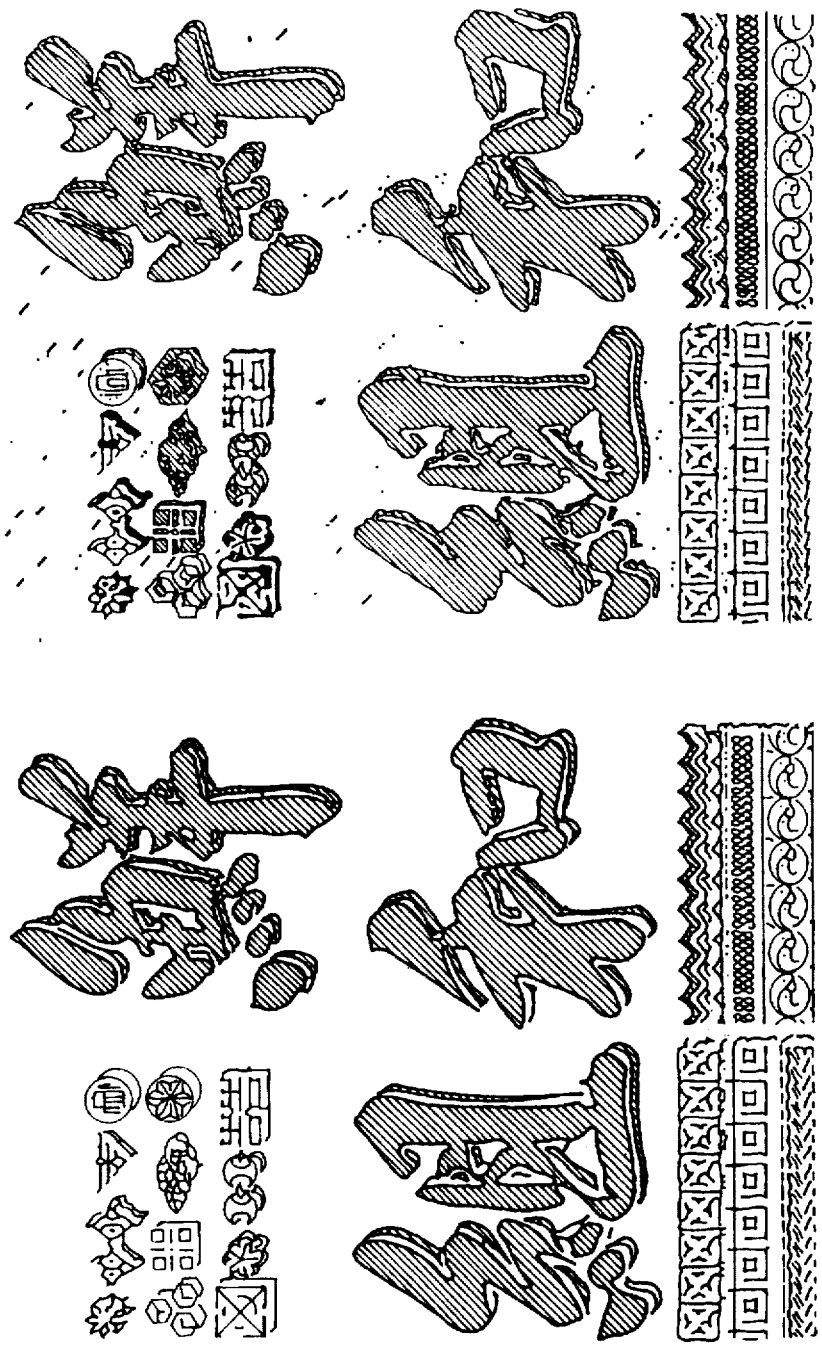
FIGS. 17A, B are views showing samples created by shadowing modes in the invention and in the conventional art.

Meanwhile, when copying is effected with an original document having smudges and/or using the original table 5 smeared, invisible small dust (or noises) could be picked up as image data, whereby even the noises are shadowed. Specifically, as shown in FIG. 16A, a smudge D is added with a one-pixel shadow. If shadows of 0.5 mm in length is created, the smudge D will be attached with a shadow of eight pixels. Thus, unessential noises tend to be emphasized. To avoid this tendency, the processing scheme will be set up as follows, by considering that noises made by small dirt and dust are low in density. That is, a threshold quantized density is set up for observed pixels E so that low-density pixels may be neglected to be shadowed. Here, the threshold density is set at level '1'. When an observed pixel E has a density of level '1', the system stops the comparison between the observed pixel E and the target pixel I for determining the maximum of the two and the shadowing density conversion. When copying operation is effected based on the scheme, the smudge D is not shadowed as shown in FIG. 16B. Although the above threshold density is set at level '1', this can be varied. FIG. 17A shows a copy sample created based on the above scheme. As is apparent from the sample, no noises made by dirt and smudges etc., are shadowed and emphasized, therefore it is possible to make a natural duplication free from degradation of images. This scheme is particularly effective in duplicating an original document containing high-density characters and relatively bigger characters.

In place of the above embodiment in which it is possible to prohibit shadowing for noises by taking advantage of the fact that the density of dust and the like is low, shadowing for noises may be prohibited by taking advantage that dust and the like are isolated. That is, when an image shown in FIG. 18A is picked up, noises due to dust etc., are discriminated as follows. Initially, in order to avoid misjudgment between noises and characters, a 3×3 matrix filter is set up in such a manner as shown in FIG. 19 that the observed pixel E has a density of level '1' while the other enclosing pixels have a density of level '0'. When an observed pixel E has a density of level '1', the system compares the density between the observed pixel E and the shadowing target pixel I to determine the maximum. In this case, if all the enclosing pixels have a density of the predetermined level (i.e., '0') and the density of the observed pixel E is lower than the threshold density (i.e., '1' in this embodiment), the system determines that the observed pixel E in question is a noise and will not effect shadowing density conversion for the pixel. As a result, the shadowing operation is done expect isolated smudges of a single pixel, as shown in FIG. 18B. In this way, it is possible to discriminate noises due to dust etc., from valid image elements. As a result, it is possible to create a natural duplication free from degradation of images without noises emphasized. This method is particularly effective in duplicating an original document containing small characters.

On the other hand, if the density of shadows is set close to that of the original image, it becomes difficult to discriminate the shadow from the original image. Alternatively, if the density of shadows are set darker than that of the original image, the character and shadow appear reversed to make characters look thicker and blurred, to thereby degrade the image quality of the shadowed image. Therefore, the density of the shadowing pixel I should be set to be lower than that of the observed pixel E in converting the density of target pixels. FIG. 20 shows examples of the relation between the density of the observed pixel E and the target pixel I, in which a density relation $D_E>D_I$ holds. This setup condition makes clear the distinction between the original image and the shadowing image to create a good copy output.

In this copier, it is possible to create a shadow in other positions than the position described above or extending 45° right below as well as to adjust the density of shadow. For example, it is possible to set up a condition of creating a shadow extending 45° left below, through the setup frame for the shadowing and hollowing mode. In this condition, a pixel designated by G in FIG. 21A becomes a new target pixel relative to the observed pixel E. As in the manner described referring to FIG. 11, a maximum should be determined from these pixels in the filter. Since the observed pixel E has a density of level '3' and the shadowing target pixel G has a density of level '0' while the other pixels are being masked, the maximum value thereof is determined to be '3' so that the shadowing target pixel G is outputted with a density of level '3'. In consequence, an shadowing image is formed as shown by a hatched portion in FIG. 21B. As the shadowing target pixel G is outputted with the density of level '3', the density converting processor 51d converts the density of shadow in accordance with a converting table (shown in FIG. 22) in which converted values are related with the density levels. FIG. 22 shows an example in which the density of shadow is fixed at level '2'. When a lighter shadow is to be added, the density of shadow is converted in accordance with a converting table shown in FIG. 23 in which the density of shadow is fixed at level '1'. The above process is repeated until the shadow becomes a designated length. The thus formed shadowing image is composed on the original image to thereby complete the shadowing process. When shadows extending 45° left above is to be made, it is possible to create a shadow extending 45° left above as shown in FIG. 24B by using a matrix filter shown in FIG. 24A. In this way, it is possible for the user to create various kinds of shadows extending in a desired direction, by selecting a different target pixel from the matrix filter and allowing the selected pixel to make logical operations with the observed pixel E. It is also possible for the user to select a desired density of shadows. The combination of these features enables the copier to create a great variety to the images.

Figure 25:
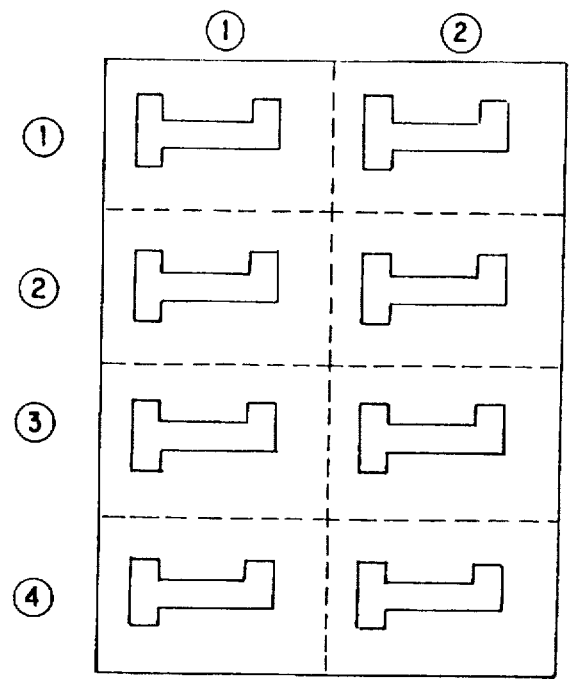
FIG. 25 is a view showing an image where a 2×4 repeat copy is made.

As another mode for image processing and edition, the copier has a repeat-copy function, as illustrated in FIG. 25. This mode can be set up through the function selecting key on the control panel 54 and allows, for example, an A4-sized original document to be repeatedly reproduced in (2×4) or eight sections on A4-sized paper. Now, let us consider a case where an original is reproduced in the repeat-copy mode while shadows extending 45° right below relative to the original document are created. In this case, when the image processing CPU 55, which controls the whole copier, instructs the image to rotate, the operation is performed in the following manner. That is, as the operator places an A4-sized original document on the original table 5 or the original document feeder (RDF) 6, the original-size detector detects the size of the original document and recognizes it as A4. Since, in this mode, the A4-sized original is designated to be reproduced in 2×4 or eight sections on a sheet having the same size, i.e., A4 paper, it is naturally impossible to fit copy images into the sheet if no data processing is made. In order to fit the repeated copy images within the frame, the image processing CPU 55 instructs the image processing means 72 to change the size of the image and to make a rotation of the image. An image on the original placed is processed through the image data inputting unit 50 and is stored as image data into the memory 53 so that further various process may be done in the image processing unit 51. More specifically, initially, the image data is quantized into quaternary data through the error-diffusing processor 50c in the image data inputting unit 50 and the quantized data is stored temporarily in the memory 53. Then, the image processing CPU 55 rotates the image data clockwise 90°. The thus rotated image data is again stored into the memory 53. The multi-valuing processor 51a converts the image data into 256-valued data. Then, the thus processed data is varied as to magnification in the magnification/reduction processor 51e so that all the repeated images may be fitted within the frame. Thereafter, the data is reconverted into quaternary data in the compressing processor 51h so as to temporarily be stored in the memory 53. Subsequently, the image processing CPU 55 loads the reduced data stored in the memory 53 and repeats it eight-fold to create developed image data representing 2×4 sections as designated. The thus developed data is stored into the memory 53.

Figure 26:
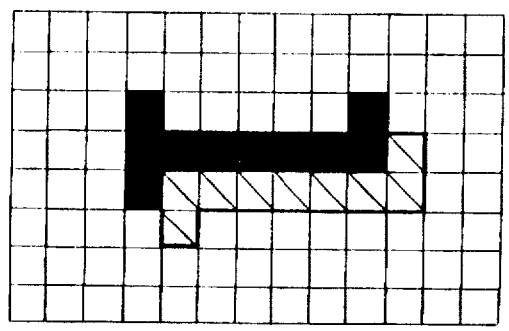
FIG. 26 is a view showing a shadowed image in which an improper shadow is formed on an image rotated.
Figure 27:
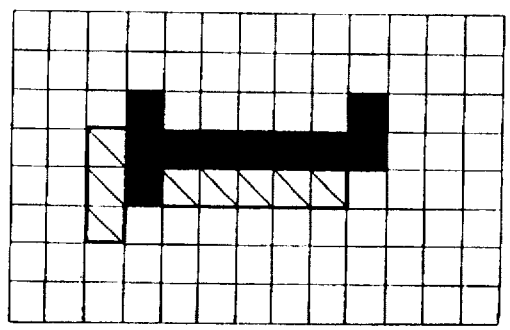
FIG. 27 is a view showing a shadowed image in which a proper shadow is formed on an image rotated.

In this process, if the image data is added with shadows as it is, the image is reproduced with shadows extending 45° right below as shown in FIG. 26. To obtain properly shadowed image, the shadowing target pixel I is replaced by the pixel G when the shadowing process in this mode is effected. Then, the thus processed data is subjected to the shadowing density conversion in the density converting processor 51d so that the density of shadows is converted at the fixed tone level '1', for example. As this process is effected throughout the frame, the image is added with shadows of one-dot length left below as shown in FIG. 27. In this case, if the resolution is 400 dpi and shadows of 0.5 mm in length are desired, the above procedure should be repeated eight times to complete the image data with the desired shadow. In the final stage, the image modification/edition/composition processor 51c combines the thus formed shadow image data with the original image data stored in the memory 53, to thereby complete the shadowing process. The thus generated image data is supplied from the image data outputting unit 52 to the laser printer system 2 to complete the operation. In this way, even if the image is rotated, shadows in the same positions with those formed when the image is not turned, can be added by changing the selection of the shadowing target pixel, whereby it possible to obtain an image free from incongruity.

As a function for image processing and edition, the copier has a mode in which an image can be rotated so as to be fitted within the frame of a sheet when the way an original document is laid differs from that of the paper.

For example, when an original shown in FIG. 9 laid in a different direction relative to the normal position is added with shadows extending 45° right below, the operation is effected without any particular modification, shadows extending 45° right below will be formed on the output image as shown in FIG. 26. The output image, however, has shadows extending 45° right above when it is viewed in the same position as the original document.

To deal with the above situation, the following image processing is made. That is, when the user sets up the shadowing mode through the control panel 54 and places the A4-sized original in the reduction position (to be referred to as A4R original, hereinbelow), as shown in FIG. 9, on the original table 5 or the original document feeder (RDF) 6, the original-size detector detects the original size and position and determines it as A4R original. In this condition, when all the cassettes 35, 36 and 37 hold A4-sized sheets in the normal position, the image outputted is naturally cut off unless any treatment is made. To avoid the situation, the image processing CPU 55 compares the sheet size and its placement with those of the original document, based on the detected result of the size of the original and information on sheet size automatically detected when the cassettes are attached. If the CPU 55 determines that the placement of the original differs from that of the paper, the CPU 55 instructs the image processing means 72 to rotate the image.

Specifically, an image on the original placed is processed through the image data inputting unit 50 and stored as image data into the memory 53 so that further various process may be done in the image processing unit 51. Initially, the image data is quantized into quaternary data through the error-diffusing processor 50c in the image data inputting unit 50 and the quantized data is stored temporarily in the memory 53. Then, the image processing CPU 55 rotates the image data clockwise 90°. The thus rotated image data is again stored into the memory 53. Then, the data is made to pass through the multi-valuing processor 51a without being converted into 256-valued data by the multi-valuing process. Subsequently, this image data is subjected to the same shadowing process as effected in the above-described repeat-copy operation, to thereby complete an image with shadows as shown in FIG. 27. On the other hand, when the image is to be rotated counterclockwise 90°, the shadowing target pixel C may and should be selected. Thus, in this configuration, even if the placement of the original does not match the placement of the paper in the shadowing mode, not only the image data can be rotated but also it is possible to select a different shadowing target pixel in conformity with the rotation of the image data. Hence, it is possible to create shadows in the same position as in the image unrotated. In consequence, it is possible to create a duplication with shadows in a desired direction without considering the placing direction of the original, whereby it is possible to attain improved operating performances.

Next, when the shadowing and hollowing mode is selected, an original image is picked up by the scanner unit 7 from a document placed on the original table 5 or the document feeder 6. The picked up image data is stored into the memory 53 through the image data inputting unit 50, so that further various process may be done in the image processing unit 51. Initially, the image data is quantized into quaternary data in the error-diffusing processor 50c in the image data inputting unit 50. The thus quantized data is stored into the memory 53 and made to pass through the multi-valuing processor 51a without being converted into 256-valued data by the multi-valuing process. The image data is then image-processed in the image modification/edition/composition processor 51c using the 3×3 matrix as shown in FIG. 8. The original-image data as shown in FIG. 9 is supplied to the 3×3 matrix filter in the order of (0,0), (1,0) ... (12,12), (13,12). A line buffer is placed before the filter. In this arrangement, the filter becomes able to start processing the data only when first three lines are inputted to the line buffer. The filter is so set up as to have a code for taking a maximum value of density among an observed pixel E and peripheral pixels A, B, C, D, G, H and I.

Figure 10B:
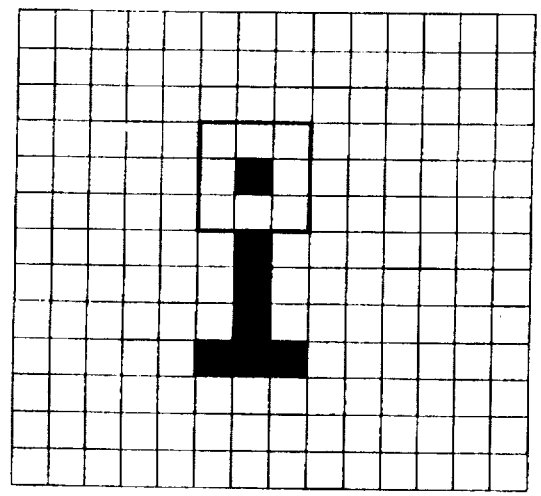
FIG. 10B is a view showing a state where the original image is covered with the filter.
Figure 28:
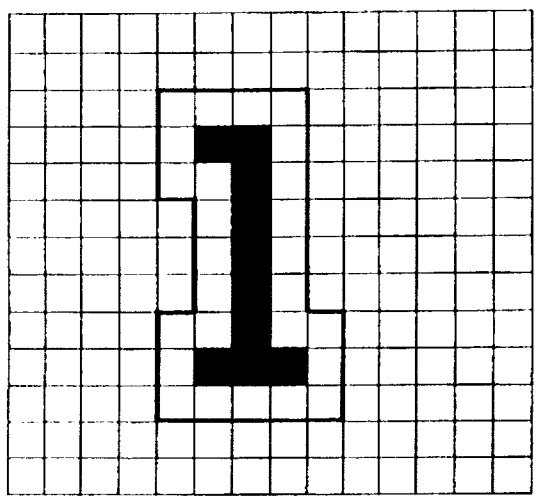
FIG. 28 is a view showing an expanded image in the shadowing and hollowing mode.
Figure 29:
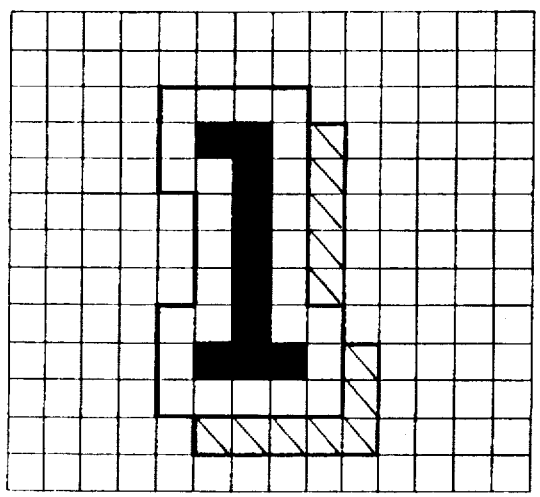
FIG. 29 is a view showing an expanded image with a shadow added.
Figure 30:
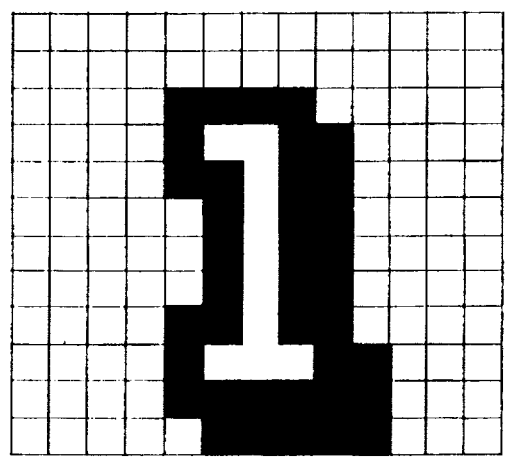
FIG. 30 is a view showing a shadowed and hollowed image.

Referring now to FIG. 10B, in order to take a maximum value of density among an observed pixel E and peripheral pixels A, B, C, D, G, H and I as expanding target pixels, the system determines that the observed pixel A and expanding target pixels A, B and H have a density of level '3' while the other pixels have a density of level '0'. Accordingly, the maximum value is determined to be '3', so that the density of all the expanding target pixels is set at level '3'. Repeated operations of the above process throughout the whole frame of the image, generate a one-pixel expanded image as shown in FIG. 28. Then, the thus generated image is subjected to the shadowing treatment. As a result, an expanded image with shadows having a converted density of level '2' is formed as shown in FIG. 29. In the final stage, the image modification/edition/composition processor 51c removes the original image stored in the memory 53 from the expanded image with shadows so that an shadowed and hollowed image is formed as shown in FIG. 30. The thus generated image data is supplied from the image data outputting unit 52 to the laser printer system 2, which in turn outputs a hollowed image with one-dot shadow.

The above shadowing and hollowing process can be summarized by the following algorithm:

(1) Create a hollowed image from an original image by deleting any observed pixel E having a density of level '1' in original image data.

(2) Compare the density of an observed pixel E with all the peripheral pixels A, B, C, D, G, H and I to determine the maximum and create a one-dot expanded image section from the observed pixel E.

(3) Repeat the above step (2) along boundary pixels to complete an expanded image.

(4) Create a shadow for the expanded image.

(5) Compare the density of each observed pixel E with that of a corresponding target pixel I to determine the maximum density of the compared pixels.

(6) Convert the shadow density based on the maximum density.

(7) Repeat the above procedures (5) and (6) certain times in accordance with a specified length of shadow to complete the creation of a shadowing image.

(8) Cut out the original image from the expanded image with shadows.

Here, in order not to emphasize noises, any image data having a density of less than level '1' is assumed to be image noises and only the data having a density of level '2' or more is used to effect the hollowing operation.

When only hollowing treatment is to be made, after the above steps (1), (2) and (3), the following step is done as step (4):

(4) Cut out the original image from the expanded image to complete a hollowed image.

Since an image loop for the expanding treatment creates onedot contour lines, the loop may and should be repeated twice to create two-dot contour lines.

Figure 31B:
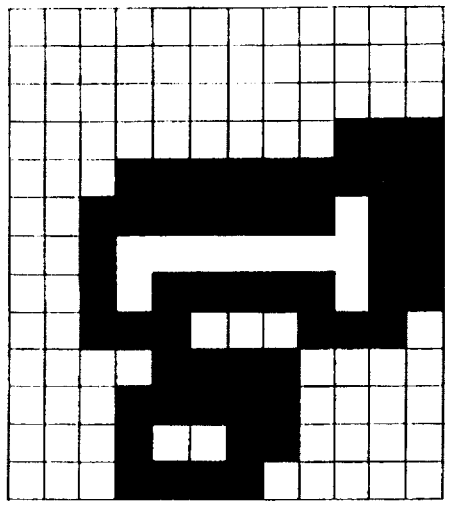
FIG. 31B is a view showing a shadowed and hollowed image in which a smudge is shadowed and hollowed.
Figure 31A:
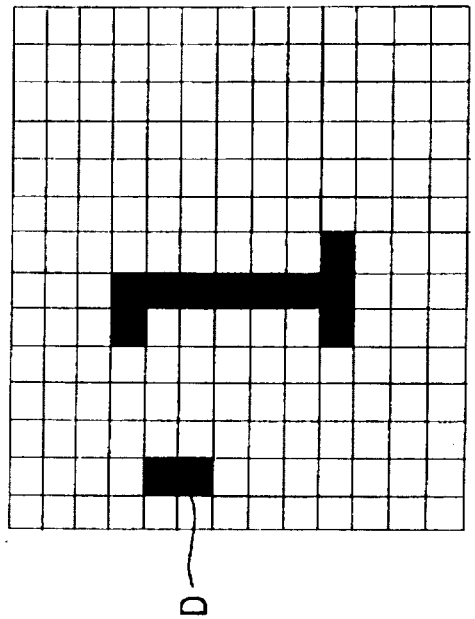
FIG. 31A is a view showing an original image having a smudge.
Figure 32B:
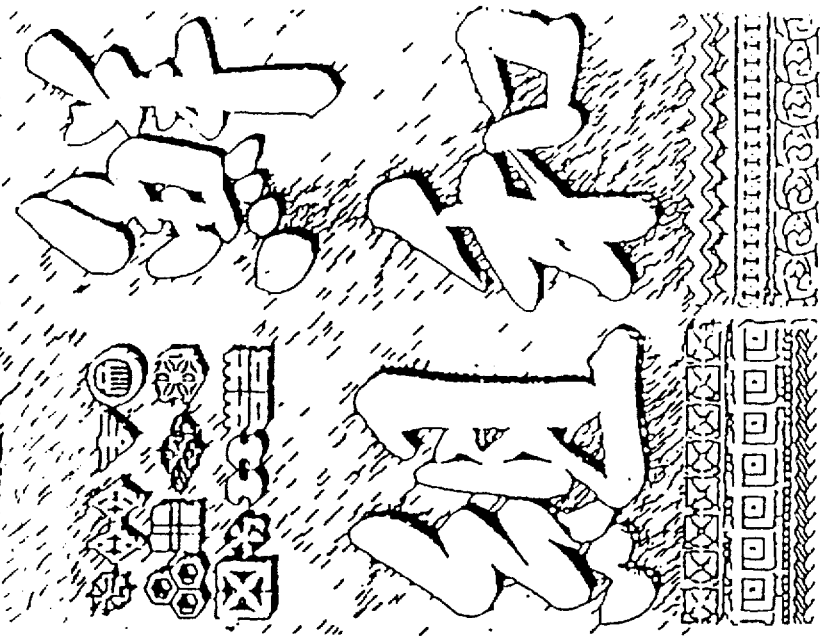
FIGS. 32A, B are views showing samples created by shadowing hollowing modes in the invention and in the conventional art.
Figure 32A:
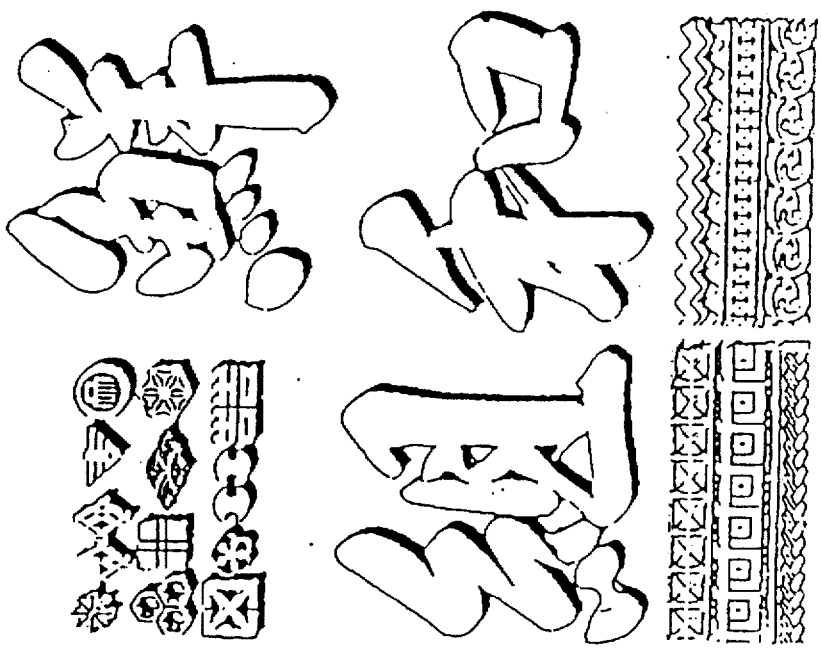
Figure 33A:
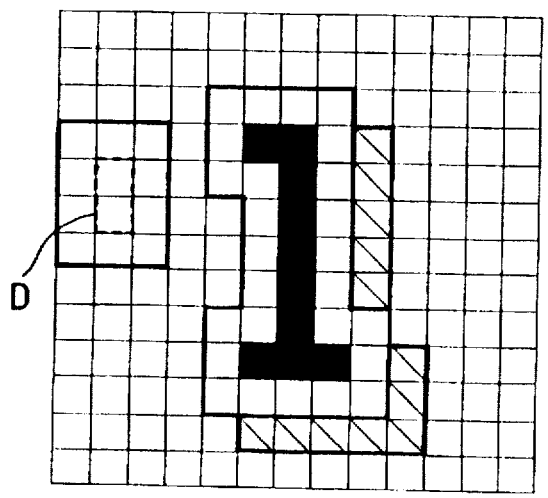
FIG. 33A is a view showing a processed image where no shadowing density conversion is effected for smudges.
Figure 33B:
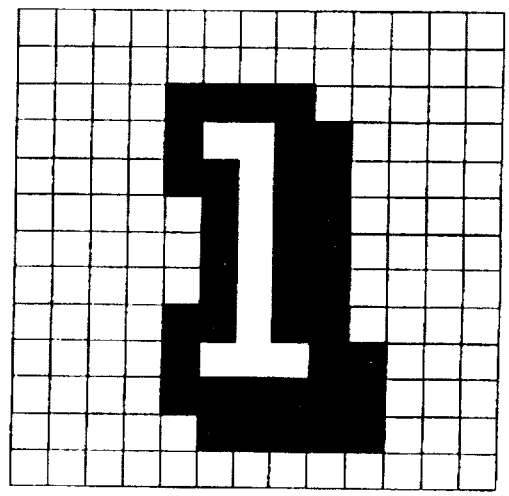
FIG. 33B is a view showing a shadowed and hollowed image which is image-processed with no smudge shadowed and hollowed.

Meanwhile, when copying is effected with an original document having smudges and/or using the original table 5 smeared, invisible small dust (or noises) could be picked up as image data, whereby even the noises are expanded (and hollowed). Specifically, as shown in FIG. 31B, if an invisible smudge (noise) D is expanded (and hollowed) and added with one-pixel shadows, the resulting image becomes as shown in FIG. 31B. If the smudge is added with shadows having a length of 0.5 mm, the resulting image becomes as shown in FIG. 32B, or smudges (noises) are added with shadow having 8 pixels in length to thereby create noises emphasized. To avoid this situation, the processing scheme will be set up as follows, by considering that noises made by small dirt and dust are low in density. That is, a threshold quantized density is set up for observed pixels E so that low-density pixels may be neglected to be shadowed. Here, the threshold density is set at level '1'. When an observed pixel E has a density of level '1', the system stops the comparison between the observed pixel E and the target pixel I for determining the maximum of the two and the shadowing density conversion. When copying operation is effected based on the scheme, the smudge D is not shadowed and hollowed as shown in FIGS. 33A and 33B. Although the above threshold density is set at level '1', this can be varied. In this way, no noises made by dirt and smudges etc., are shadowed and hollowed, or emphasized, therefore it is possible to make a natural duplication free from degradation of images. This scheme is particularly effective in duplicating an original document containing high-density characters and relatively bigger characters.

Figure 34A:
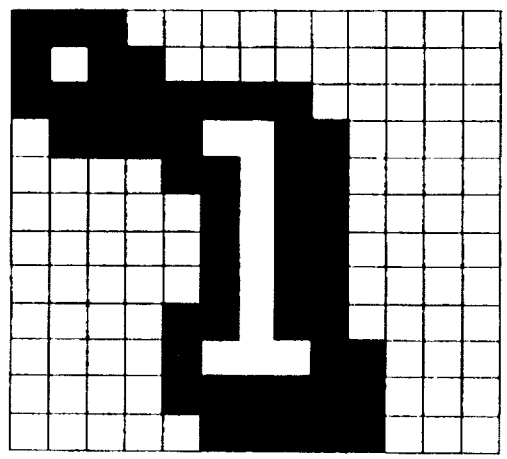
FIG. 34A is a view showing a shadowed and hollowed image in which a smudge is shadowed and hollowed.
Figure 34B:
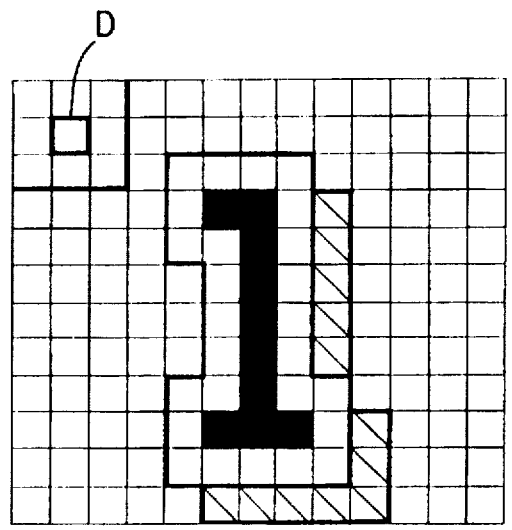
FIG. 34B is a view showing a processed image where no shadowing density conversion is effected for smudges.
Figure 34C:
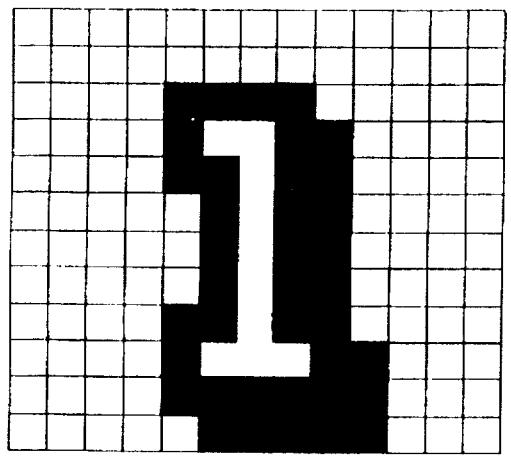
FIG. 34C is a view showing a shadowed and hollowed image which is image-processed with no smudge shadowed and hollowed.

Since it is hard to discriminate smudges from an original image when the original document contains small characters and colored characters other than those in black, the above measure does not work enough. In such a case, if a document has an image as shown in FIG. 34A, it is useful to discriminate smudges by taking advantage that dust and the like are isolated. That is, initially, in order to avoid misjudgment between noises and characters, a 3×3 matrix filter is set up in such a manner as shown in FIG. 19 that the observed pixel E has a density of level '1' while the other enclosing pixels have a density of level '0'. When an observed pixel E has a density of level '1', the system compares the density between the observed pixel E and the peripheral pixels to determine the maximum of them. In this case, if all the enclosing pixels have a density of the predetermined level (i.e., '0') and the density of the observed pixel E is lower than the threshold density (i.e., '1' in this embodiment), the system determines that the observed pixel E in question is a noise and will not effect shadowing density conversion for the pixel. As a result, the expanding and shadowing operation is done expect isolated smudges of a single pixel, as shown in FIG. 34B, to thereby output an image shadowed and hollowed as shown in FIG. 34C. In this way, it is possible to discriminate noises due to dust etc., from valid image elements. As a result, it is possible to create a natural duplication free from degradation of images without any noises emphasized. This method is particularly effective in duplicating an original document containing small characters or an original of light tones.

Figure 35A:
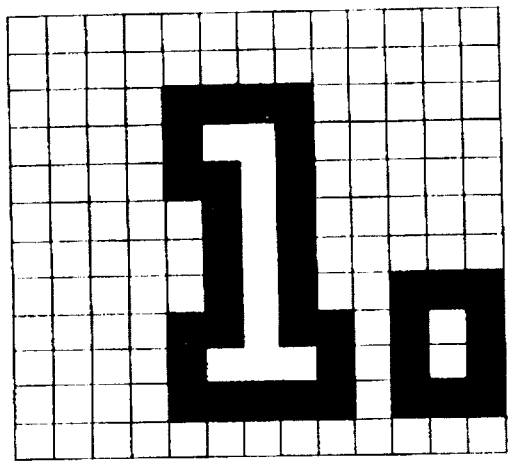
FIG. 35A is a view showing a shadowed and hollowed image in which a smudge is shadowed and hollowed.
Figure 35B:
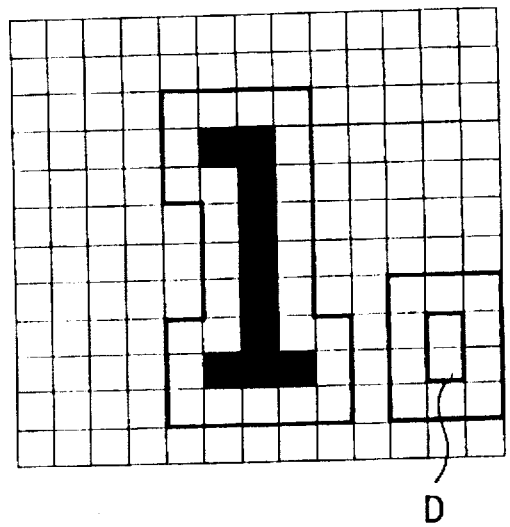
FIG. 35B is a view showing a processed image where no shadowing density conversion is effected for smudges.
Figure 35C:
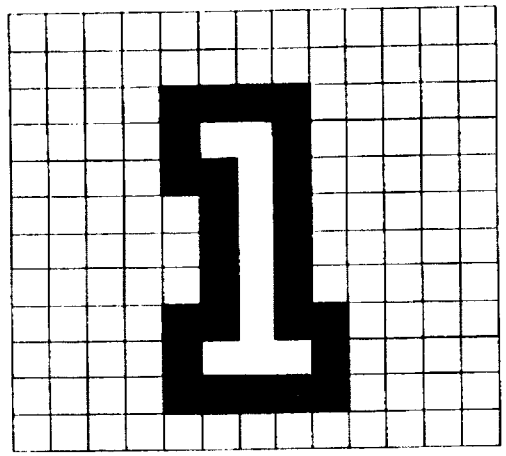
FIG. 35C is a view showing a shadowed and hollowed image which is image-processed with no smudge shadowed and hollowed.
Figure 36A:
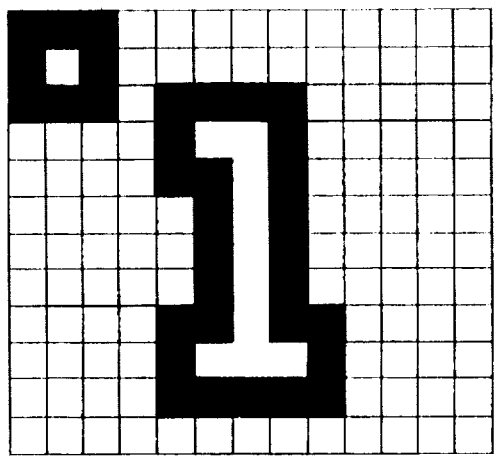
FIG. 36A is a view showing a hollowed image with a smudge hollowed.
Figure 36B:
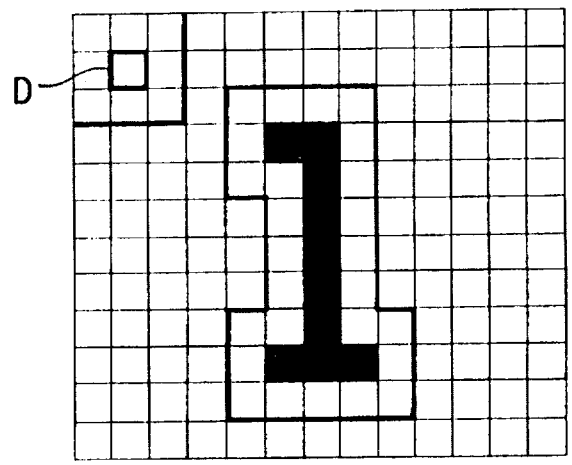
FIG. 36B is a view showing a processed image where no hollowing operation is effected for smudges.
Figure 36C:
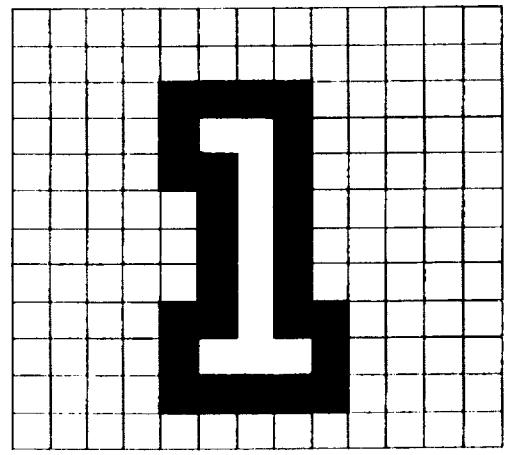
FIG. 36C is a view showing a hollowed image which is image-processed with no smudge hollowed.

The above two kinds of treatments can be applied to the hollowing mode. In the first treatment, an image shown in FIG. 35A is processed as shown in FIG. 35B and converted into a hollowed image as shown in FIG. 35C. In the second treatment, an image shown in FIG. 36A is processed as shown in FIG. 36B and converted into a hollowed image as shown in FIG. 36C. Since any noises formed by dirt and smudges are not hollowed as apparent from the samples shown in FIGS. 37A, B, it is possible to create a natural duplication free from degradation of images without any noises emphasized.

In this way, since a shadowed and hollowed image is formed by cutting out an original image from an image expanded and shadowed from the original image; if the density of the shadow after the density conversion is set at as low as that in the shadowing mode, for example, level '1', the outline becomes unclear. To avoid this, the shadow after the density conversion should be set at a greater level, for example '2'. With this setup, the outline appears sharp, thus making it possible to create a good duplication result.

Next, when the halftoning mode is selected, image data picked from an original is stored into the memory 53 through the image data inputting unit 50, so that further various process may be done in the image processing unit 51. Initially, the image data is quantized into quaternary data in the error-diffusing processor 50c in the image data inputting unit 50. The thus quantized data is stored into the memory 53 and made to pass through the multi-valuing processor 51a without being converted into 256-valued data by the multi-valuing process. The image data is then image-processed in the image modification/edition/composition processor 51c using the 3×3 matrix as shown in FIG. 8. The original-image data as shown in FIG. 9 is supplied to the 3×3 matrix filter in the order of (0,0), (1,0) ... (12,12), (13,12). A line buffer is placed before the filter. In this arrangement, the filter becomes able to start processing the data only when first three lines are inputted to the line buffer. The filter is so set up as to have a code for taking a maximum value of density among an observed pixel E and peripheral pixels A, B, C, D, G, H and I.

Figure 38:
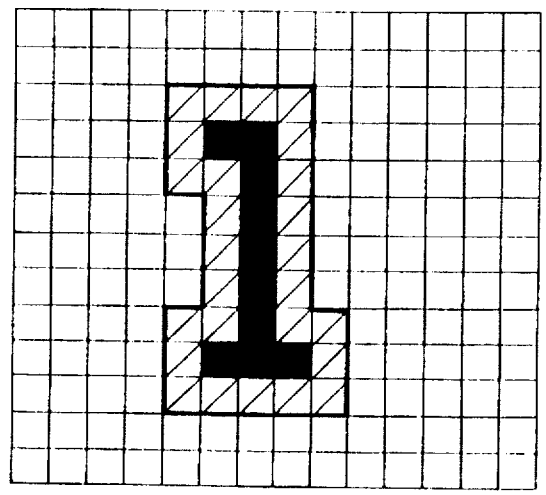
FIG. 38 is a view showing a processed image which is expanded in the halftoning mode.
Figure 39A:
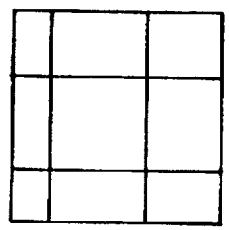
FIG. 39A is a view showing a screen pattern.
Figure 39B:
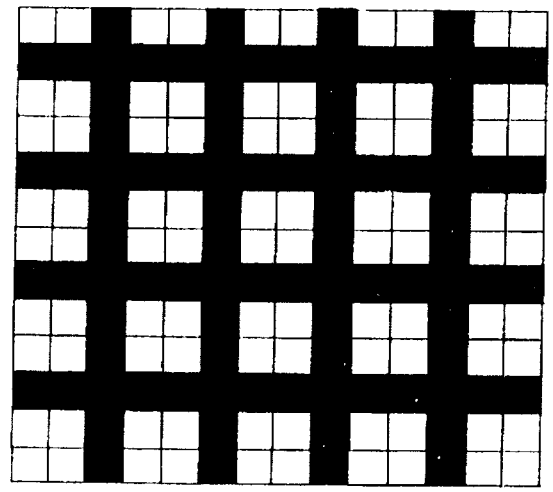
FIG. 39B is a view showing a screen image.
Figure 40:
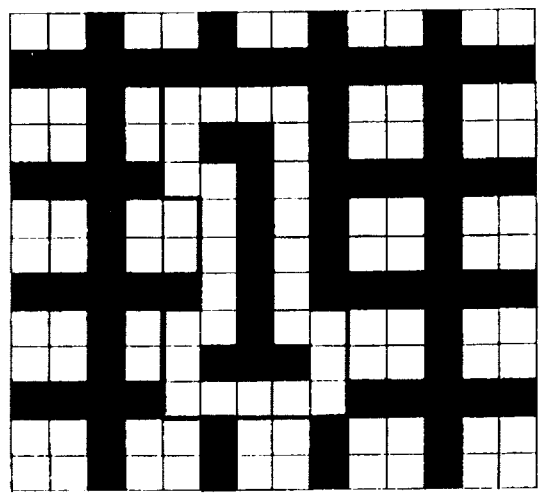
FIG. 40 is a view showing a halftoned image.

Referring now to FIG. 10B, in order to take a maximum value of density among an observed pixel E and peripheral pixels A, B, C, D, G, H and I as expanding target pixels, the system determines that the observed pixel E and expanding target pixels A, B and H have a density of level '3' while the other pixels have a density of level '0'. Accordingly, the maximum value is determined to be '3', so that the density of all the expanding target pixels is set at level '3'. Repeated operations of the above process throughout the whole frame of the image, generate a one-pixel expanded image as shown in FIG. 38. A screen pattern as shown in FIG. 39A is developed to form a screen image as shown in FIG. 39B. As the above expanded image is cut off from the screen image and then the resulting image is combined with the original image so as to provide a halftoned image as shown in FIG. 40. The thus generated image data is supplied from the image data outputting unit 52 to the laser printer system 2, which in turn outputs a one-dot halftoned image.

The above halftoning process can be summarized by the following algorithm:

(1) Compare the density of an observed pixel E with all the peripheral pixels A, B, C, D, G, H and I to determine the maximum and create a one-dot expanded image section from the observed pixel E.

(2) Repeat the above step (1) along boundary or clearance pixels to complete an expanded image.

(3) Overlap a screen pattern on the white-data areas of the expanded image to form a screen image.

(4) Combine the original image onto the screen image to complete a halftone image.

The above procedure halftones only the white data areas of the expanded image but will not dot the black data areas (halftone or edges). Accordingly, clearances appear around the black data areas. In the conventional halftoning process of this kind, since the whole image used to be dotted, the original image would be degraded. Alternatively, in order not to deteriorate the original image, edges should have been detected to avoid halftoning the areas which were determined as edges. Therefore, this process required much time. In contrast to this, since the process of the invention does not halftone the original image, it is possible to obtain good duplications. Since the process is so simple that it is possible to improve processing efficiency and therefore reduce the processing time.

Figure 41A:
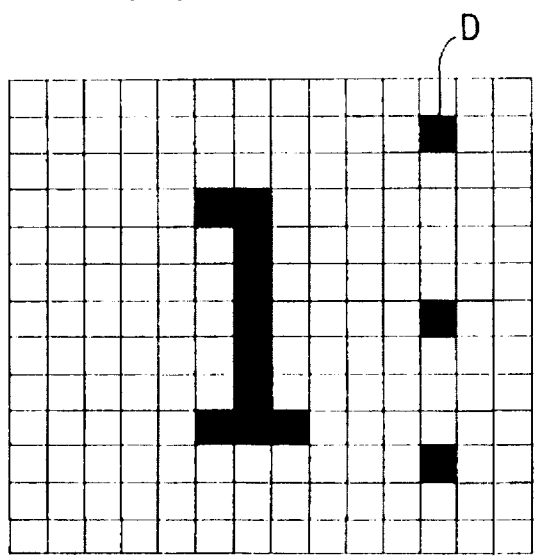
FIG. 41A is a view showing an original image having smudges.
Figure 41B:
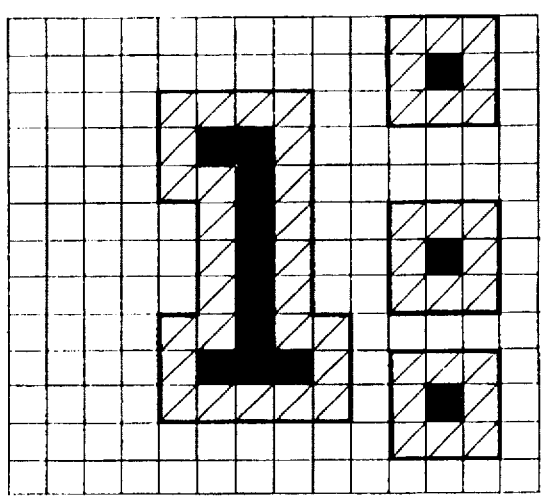
FIG. 41B is a view showing a processed image with smudges expanded.
Figure 41C:
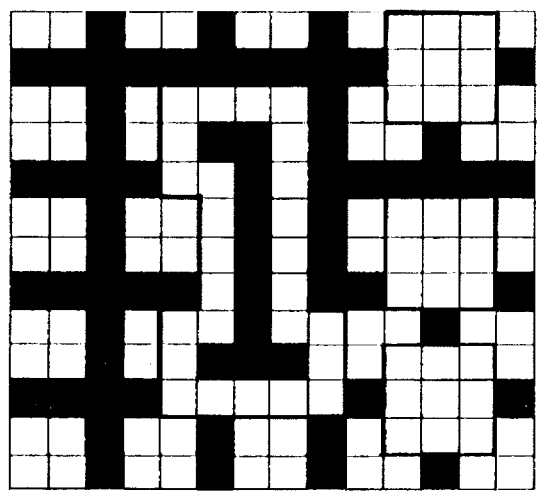
FIG. 41C is a view showing a screen image with smudges halftoned.
Figure 42B:
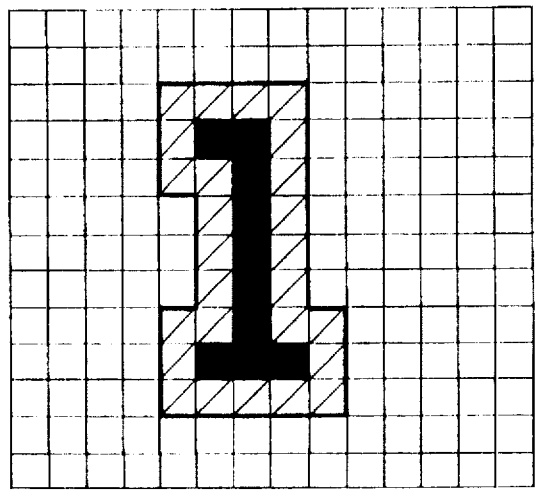
FIG. 42B is a view showing a halftoned image which is image-processed with no smudge is covered with a screen.
Figure 42A:
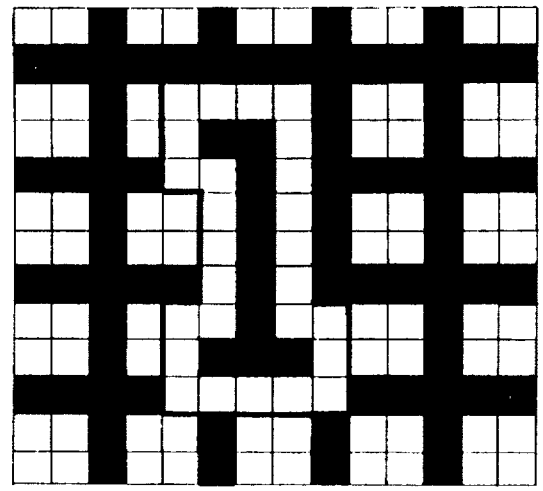
FIG. 42A is a view showing a processed image with no smudge is expanded.

When copying is effected with an original document having smudges as shown in FIG. 41a and/or using the original table 5 smeared, small smudges D also undergo the expanding conversion as shown in FIG. 41B, and consequently, the smudges D also used to be halftoned as shown in FIG. 41C, resulting in unnatural output. To avoid this situation, the processing scheme will be set up as follows, by considering that noises made by small dirt and dust are low in density. That is, a threshold quantized density is set up for observed pixels E so that low-density pixels may be neglected to be shadowed. Here, the threshold density is set at level '1'. When an observed pixel E has a density of level '1' or less, the system stops the comparison between the observed pixel E and the target pixel I for determining the maximum of the two and the expanding process. Accordingly, the expanded image created becomes as shown in FIG. 42A. The thus expanded image is overlapped with a screen pattern to form a screen image, which in turn combined with the original image to complete a halftone image as shown in FIG. 42B. In this way, it is possible to halftone noises made by dirt and smudges etc., which would be not halftoned but emphasized by clearances if the above noise reduction scheme was not adopted. As a result, it possible to produce good duplications free from degradation of images.

As has been described heretofore, in the conventional image processing, when shadowing and expanding processes are to be done, it was necessary that the CPU should search all the pixels having densities and extract widths of the picture elements in order to calculate the size of shadows and line widths for expansion. Accordingly, it would take a longer processing time as the image to be handled becomes complicated. In contrast, it is possible for the present invention to attain high-speed processing since the shadowing and expanding operation can be done by only the simple convolution operation for images, without regarding type of images. Therefore, the image processing of any images, even if complicated, can be done within a short period of time. Further, without needing any complicated processing, it is possible to eliminate noises which are generated by smudges on the original or dirt and dust of the original table or by any other factors and would be emphasized in the conventional processing. In consequence, it is possible to improve quality of images in the copying operation of this kind.

It is noted that the present invention should not be limited to the above specific embodiments, but many changes and modifications may of course be added to the above embodiment within the spirit and scope of the invention. For example, in place of lowering the density of the target pixel, it is possible to set up the density of the target pixel at a greater level than that of the observed pixel, if the shadow is desired to be intensified. It is also possible to set up the density of the image created by the image processing at any dark or light level. Alternatively, it is possible to add tones even within a single frame of image. Moreover, any combination of image processing modes can be selected. Other examples of image processing modes include a mode for changing the thickness of lines, a mode for white-shadowing and a mode for hollowing and white-shadowing.

As has been apparent from the above description, in accordance with the present invention, since the method of image processing can be simplified, it is possible to handle even a complicated image within a short period of time. Therefore, it is possible to realize high-speed processing, regardless of type of images. Further, since all the image processing modes can be effected in the similar manner, it is possible to improve efficiency of the image processing.

In accordance with the present invention, since the density of the target pixel can be varied in accordance with the tone of an original image handled, a faithful reproduction of an original image can be created in the processed image, without being degraded in its quality of image. Further, it is possible to emphasize an original image and if the original contains halftoned portions, it is possible to create a great variety to the reproduced image, without degrading quality of the original image.

In accordance with the present invention, desired shadows by the user can readily be formed, it is possible to create a great variety to the image.

In the conventional processing, it was necessary to expand an image from an original, remove the original image from the expanded image and create contour lines before effecting a shadowing operation. In the present invention, however, shadows are formed by shadowing the expanded image and removing the original image from the expanded and shadowed image. As a result, the processing can be simplified, thus realizing improved processing efficiency and reduced processing time.

Since, unlike the prior art, all the image of an original is not dotted when the original image is to be halftoned, it is possible to obtain a well-reproduced image without any features of the original image degraded. Besides, since the configuration of the present invention does not need to search edge portions, it is possible to realize improved processing efficiency and reduced processing time.

What is claimed is:

1. An image processing apparatus comprising:
a mode-setup means for designating an image processing mode, wherein said mode-setup means sets up any one of image processing modes including shadowing, hollowing and halftoning modes or a combined image processing mode of the three;
a determining means for determining target pixel or pixels to be compared to an observed pixel, in accordance with an image processing mode designated;
a comparing means for comparing the density between said observed pixel and said target pixel or pixels;
a converting means for converting the density of said target pixel or pixels based on the result of the comparison;
a matrix-setup means for designating an arbitrary observed pixel and setting up a matrix of pixels containing said observed pixel at a center thereof and candidate pixels for target pixels around said observed pixel;
a means for selecting a target pixel or pixels from said candidate pixels around said observed pixel, in accordance with a setup mode;
a means for repeatedly operating each means of image processing over the whole image information to generate image information; and
a means for forming an image by making logical operations between said image information generated by the image processing and information on the original image.

2. An image processing apparatus according to claim 1, further comprising a system for the shadowing and hollowing mode, which includes: an expanding means for expanding peripheral pixels around an observed pixel on image information as to an original image, in a predetermined amount of pixels; a shadowing means for adding shadows extending toward a predetermined direction to the image information on the image expanded; and an image processing means for removing the image information on the original image from the image information on the shadowed image.

3. An image processing apparatus according to claim 2, wherein said shadowing and hollowing operation includes the steps of: effecting a logical operation of comparing the density of an observed pixel and all expanding target pixels around the observed pixel to take a maximum value of those pixels so as to create one-dot expanded image, said logical operation being repeated for every observed pixel along contour lines throughout the original image to form a completely expanded image; shadowing said expanded image; taking a maximum value of density of an observed pixel and a shadowing target pixel; repeatedly converting the density of shadows based on the result of said maximum taking operation between the observed pixel and the shadowing target pixel, in accordance with a designated length of shadow, until a desired, shadowed and expanded image is formed; and removing the original image from said shadowed and expanded image, to complete a shadowed and hollowed image.

4. An image processing apparatus according to claim 2, wherein, in effecting the shadowing and hollowing operation, no conversion of density of shadows is effected.

5. An image processing apparatus according to claim 1, further comprising a system for the halftoning mode which includes: an expanding means for expanding peripheral pixels around an observed pixel on image information as to an original image, in a predetermined amount of pixels to create an expanded image; a pattern generating means for generating specific image pattern information; a removing means for removing the expanded image information from said image pattern information; and an image processing means for fitting the original image information onto the image pattern information with a portion corresponding to the expanded image information removed.

6. An image processing apparatus according to claim 5, wherein said halftoning operation includes the steps of: effecting a logical operation of comparing an observed pixel and all expanding target pixels around the observed pixel to take a maximum value of density of those pixels so as to create one-dot expanded image, said logical operation being repeated for every observed pixel along clearance pixels throughout the original image to form a completely expanded image; overlapping a screen pattern on white-data areas of said expanded image to form a screen image; and removing said expanded image from the screen image and combining the original image onto the screen image to complete a halftone image.

7. An image processing apparatus according to claim 5, wherein neither determining operation of taking a maximum of density of an observed pixel and expanding target pixels nor expanding operation is effected in effecting the halftoning operation.

8. An image processing apparatus according to claim 1 further comprising:
a means for arbitrary selecting a direction of shadows, characterized in that selection of a target pixel is made in such a manner that the target pixel to be selected from said candidate pixels around said observed pixel is located in the shadowing direction relative to said observed pixel.

9. An image processing apparatus according to claim 8, wherein said shadowing operation includes the steps of: effecting a logical operation of comparing an observed pixel and a shadowing target pixel to take a maximum value of the density of the two, said logical operation being repeated for every observed pixel throughout the original image; converting the density of shadows to create a shadowing image data; and combining the original data with said shadowing image data to complete a shadowed image.

10. An image processing apparatus according to claim 9, wherein, in effecting the shadowing operation, no conversion of density of shadows is effected.

11. An image processing apparatus according to claim 9, wherein, in effecting the shadowing operation, the density of a target pixel is set up at a lower density than that of a corresponding observed pixel when the density of shadows is converted.

12. An image processing apparatus comprising:

a mode-setup means for designating an image processing mode, wherein said mode-setup means sets up any one of image processing modes including shadowing, hollowing and halftoning modes or a combined image processing mode of the three;

a determining means for determining target pixel or pixels to be compared to an observed pixel, in accordance with an image processing mode designated;

a comparing means for comparing the density between said observed pixel and said target pixel or pixels;

a converting means for converting the density of said target pixel or pixels based on the result of the comparison, said converting means differentiating the density of an observed pixel from that of a target pixel or pixels;

a matrix-setup means for designating an arbitrary observed pixel and setting up a matrix of pixels containing said observed pixel at a center thereof and candidate pixels for target pixels around said observed pixel;

a means for selecting a target pixel or pixels from said candidate pixels around said observed pixel, in accordance with a setup mode;

a means for repeatedly operating each means of image processing over the whole image information to generate image information; and a means for forming an image by making logical operations between said image information generated by the image processing and information on the original image.

* * * * *